United States Patent
Jumpertz et al.

(10) Patent No.: US 11,993,261 B2
(45) Date of Patent: May 28, 2024

(54) METHOD AND A SYSTEM FOR CONTROLLING A CONVOY INCLUDING A PILOT VEHICLE AND A DRIVERLESS VEHICLE

(71) Applicant: Swoppz, LLC, Dover, DE (US)

(72) Inventors: Peter Jumpertz, Cologne (DE); Guido Schmitz, Euskirchen (DE); Peter Theisen, Königswinter (DE)

(73) Assignee: Swoppz, LLC, Dover, DE (US)

( * ) Notice: Subject to any disclaimer, the term of this patent is extended or adjusted under 35 U.S.C. 154(b) by 352 days.

(21) Appl. No.: 17/424,782

(22) PCT Filed: Feb. 13, 2020

(86) PCT No.: PCT/IB2020/051188
§ 371 (c)(1),
(2) Date: Jul. 21, 2021

(87) PCT Pub. No.: WO2020/165824
PCT Pub. Date: Aug. 20, 2020

(65) Prior Publication Data
US 2022/0063622 A1    Mar. 3, 2022

Related U.S. Application Data

(60) Provisional application No. 62/806,877, filed on Feb. 17, 2019.

(51) Int. Cl.
*B60W 10/00* (2006.01)
*B60W 10/04* (2006.01)
(Continued)

(52) U.S. Cl.
CPC .......... *B60W 30/165* (2013.01); *B60W 10/04* (2013.01); *B60W 10/18* (2013.01);
(Continued)

(58) Field of Classification Search
CPC .... B60W 30/165; B60W 10/04; B60W 10/18; B60W 10/20; B60W 2540/10;
(Continued)

(56) References Cited

U.S. PATENT DOCUMENTS 7,593,811 B2 * 9/2009 Schmidt ............... G05D 1/0295
701/96
2006/0229804 A1   10/2006 Schmidt et al.
(Continued)

FOREIGN PATENT DOCUMENTS

EP    3423326 A1    9/2017

*Primary Examiner* — Anne Marie Antonucci
*Assistant Examiner* — Kirsten Jade M Santos
(74) *Attorney, Agent, or Firm* — Smartpat PLC

(57) ABSTRACT

A method for controlling a convoy including a pilot vehicle and a driverless vehicle is presented. It includes electronically tethering the driverless vehicle to the pilot vehicle by establishing communication between a pilot vehicle control module and a driverless vehicle control module. It further includes receiving a longitudinal control user input in the pilot vehicle control module and communicating a longitudinal motion request from the pilot vehicle control module to the driverless vehicle control module, the longitudinal motion request being indicative of the longitudinal control user input. It finally includes controlling a propulsion and braking system of the driverless vehicle in response to the longitudinal motion request received from the pilot vehicle and controlling a propulsion and braking system of the pilot vehicle, while tethered to the driverless vehicle, to maintain a target longitudinal clearance from the driverless vehicle.

22 Claims, 18 Drawing Sheets

(51) Int. Cl.
    *B60W 10/18*     (2012.01)
    *B60W 10/20*     (2006.01)
    *B60W 30/165*     (2020.01)
    *G08G 1/00*     (2006.01)

(52) U.S. Cl.
    CPC ............... *B60W 10/20* (2013.01); *G08G 1/22* (2013.01); *B60W 2540/10* (2013.01); *B60W 2540/12* (2013.01); *B60W 2556/65* (2020.02); *B60W 2710/182* (2013.01); *B60W 2720/10* (2013.01); *B60W 2720/106* (2013.01); *B60W 2754/30* (2020.02)

(58) Field of Classification Search
    CPC ......... B60W 2540/12; B60W 2556/65; B60W 2710/182; B60W 2720/10; B60W 2720/106; B60W 2754/30; B60W 10/00; G08G 1/22; G05D 2201/0213; G05D 1/0295
    See application file for complete search history.

(56) References Cited

U.S. PATENT DOCUMENTS

| | | |
|---|---|---|
| 2013/0030606 A1 | 1/2013 | Mudalige et al. |
| 2013/0041576 A1 | 2/2013 | Switkes et al. |
| 2014/0005908 A1 | 1/2014 | Kollberg et al. |
| 2015/0154871 A1 | 6/2015 | Rothoff et al. |
| 2017/0168503 A1 | 6/2017 | Amla et al. |
| 2018/0012196 A1 | 1/2018 | Ricci et al. |
| 2018/0204463 A1 | 7/2018 | Khalifeh et al. |
| 2018/0239362 A1* | 8/2018 | Amla ................... G05D 1/0295 |
| 2019/0054920 A1 | 2/2019 | Karlsson et al. |

* cited by examiner

FIG. 2

Possible Pilot Vehicle-to-Driverless-Vehicle Combinations

Legend: R = Regular case; E = Possible exception; N/P = Not possible

| | | | Driverless Vehicle(s) | | | | | | | | | | | | | | | | | |
|---|---|---|---|---|---|---|---|---|---|---|---|---|---|---|---|---|---|---|---|---|
| | | | Relation | | Vehicle type | | | | | | Vehicle control equipment | | | | Control while in convoy | | | | Approach mode | |
| | | | One | Many | PC | UT | TK | TR | BU | PO | PD | DO | HU | PM | FM | ST | HU | PM | FM |
| Pilot Vehicle | Relation | One to ... | R | | | | | | | | | | | | | | | | | |
| | | Many to ... | N/P | N/P | | | | | | | | | | | | | | | | |
| | Vehicle type | Passenger car (PC) | | | R | R | R | R | R | | | | | | | | | | | |
| | | Utility vehicle (UT) | | | E | E | E | E | E | | | | | | | | | | | |
| | | Truck/Tractor (TK) | | | E | E | R | R | E | | | | | | | | | | | |
| | | Trailer (TR) | | | N/P | N/P | N/P | N/P | N/P | | | | | | | | | | | |
| | | Bus/Shuttle (BU) | | | E | E | E | E | R | | | | | | | | | | | |
| | Driver controls type | Physical only (PO) | | | | | | | | N/P | R | R | | | | | | | | |
| | | Physical & Digital (PD) | | | | | | | | N/P | R | R | | | | | | | | |
| | | Digital only (DO) | | | | | | | | N/P | E | E | | | | | | | | |
| | Control while in convoy | Human (HU) | | | | | | | | | | | N/P | R | R | | | | | |
| | | Partially machine (PM) | | | | | | | | | | | N/P | R | R | | | | | |
| | | Fully machine (FM) | | | | | | | | | | | N/P | E | E | | | | | |
| | Approach mode | Stationary (ST) | | | | | | | | | | | | | | N/P | R | R | R |
| | | Human (HU) | | | | | | | | | | | | | | R | R | R | R |
| | | Partially machine (PM) | | | | | | | | | | | | | | R | E | R | E |
| | | Fully machine (FM) | | | | | | | | | | | | | | E | E | E | E |

Collaborative Drive Control Driving Instruction Determination

| Driving instruction | | | Selective adaptation of human driver-set parameter value | | | | | |
|---|---|---|---|---|---|---|---|---|
| Type | Para-meter | Physical controls example | Target of controller function | Criteria | Vehicle type | Vehicle type determination | Controller | Basic controller function | Further adjustments |
| Longitu-dinal | Accele-ration (positive, null, negative) | Gas pedal, brake pedal, throttle stick | Achieve target longitudinal clearance | Longitu-dinal agility | More agile | Relatively higher achieved acceleration performance | Longitudinal clearance controller | Increase/decrease acceleration | Dampening, smoothing (i.e. increased elasticity) |
| | | | | | Less agile | Relatively lower achieved acceleration performance | Human driver | None | |
| Lateral | Steering angle | Steering wheel, steering stick | Follow leading vehicle's path | Relative position on convoy's track of motion | Leading | In front of other vehicle | Human driver | None | None, beyond steering wheel transmission rate fixing |
| | | | | | Trailing | Behind other vehicle | Predictive controller | Set steering angle | Collision avoidance |

FIG. 4

| Control-related Vehicle System Parameter | Examples | Result |
|---|---|---|
| I. Vehicle system operating alignment | ■ Device and connection specifications including device types, device activation-, operation-, and communication protocols, and technical properties of devices including geographical and physical device signal ranges, technical properties of connection interfaces, including time-out values for the purpose of connection validation, and error handling protocols<br>■ Technical synchronization of operating systems (e.g. set cycle time, message formats)<br>■ Collaborative drive control application architecture, including minimum required functionality, application virtualization, error handling, syntactic and semantic data specifications, including data types, data descriptions, and data formats | Full interoperability of vehicle systems due to common set of vehicle system operating functions and system devices based on both vehicles' minimum required sets |
| II. Driving instruction control alignment | ■ Available and required regular driving instructions, e.g.<br>• Vehicle longitudinal & lateral motion, e.g. an absolute speed, a change in speed, a lane change, a turn maneuver, or a heading change.<br>• Associated vehicle instructions, e.g. engine start/stop, parking brake, lighting, direction indicator<br>• Vehicle-specific utility functions, e.g. tipper control, door open/close lock/unlock, container lock/unlock, lower-loader up/down, cement mixer drum on/off, liquid pump on/off, valve open(close)<br>• Technical state monitoring instructions, e.g. engine cooling system, oil pressure, tire pressure, fuel, cargo/passenger monitoring<br>■ Collaborative drive control functionality<br>• Longitudinal clearance controller specifications<br>• Model predictive controller specification<br>• Special-purpose driving instructions and critical vehicle technical properties e.g.<br>• Vehicle-specific steering geometry<br>• Pilot vehicle ADAS system functionality<br>• AVS / AD system functionality<br>• Irregularity handler settings, functions, and instructions | Common set of driving instructions based on both vehicles' minimum required sets and other commonly available instructions |

FIG. 13

METHOD AND A SYSTEM FOR CONTROLLING A CONVOY INCLUDING A PILOT VEHICLE AND A DRIVERLESS VEHICLE

CROSS-REFERENCE TO RELATED APPLICATIONS

This application claims the benefit of U.S. Provisional Application No. 62/806,877, filed Feb. 17, 2019, entitled "'COLLABORATIVE DRIVE CONTROL' A METHOD AND SYSTEM TO CONTROL A VEHICLE BY ANOTHER VEHICLE", the contents of which is hereby incorporated by reference in its entirety.

TECHNICAL FIELD

The disclosure relates to a method and a system for controlling a convoy including a pilot vehicle and a driverless vehicle which are electronically tethered together.

BACKGROUND

A semi-truck represents a vehicle convoy consisting of a tractor vehicle with its own propulsion unit, connected to a trailer via a physical coupling. The tractor is able to pull the trailer in all regular driving situations.

Traditional semi-truck tractors are controlled by a human driver. They accommodate the human driver by providing a driver cabin, a steering wheel, pedals or levers for acceleration or braking, gear shifters, blinker switches, light switches etc. The human driver of the tractor is responsible and accountable for controlling the convoy. Trailers are typically not separately controlled by a human driver.

Partially autonomous vehicles of SAE J3016 autonomy level 4 may be operated within a restricted design domain such as, for example, driving only on two-lane highways. A truck can be driven by a human driver to a level 4 operational design domain transfer point near the trip's origin. There, the autonomous driving system takes over. Control is handed back to a human driver whenever the level 4 domain has to be left at a second transfer point near the trip's destination.

There is a need to improve the operation of such level 4 autonomous trucks while being controlled by a human driver on their way from an origin to a transfer point and from a transfer point to their destination.

SUMMARY

Digitally coupling, also referred to as tethering, a pilot vehicle at a relay station or anywhere else to a self-propelled driverless truck will eliminate or significantly reduce cost and performance disadvantages associated with traditional tractor-trailer configurations and increase the economic benefits of level 4 autonomous trucks. Providing drivers with multi-purpose vehicles, i.e. for the purpose of piloting truck as well as commuting to and from transfer points allows for flexibility and just-in-time supply. In addition, driverless trucks piloted by separate vehicles do not need expensive, heavy, and large driver cabins.

Furthermore, digital coupling of two or more vehicles is not limited to the cargo truck segment. Rather, this solution can be applied to various scenarios of freight transport, vehicle logistics, and passenger transport. Pilot vehicles may be used to pilot any other non-, semi- or fully autonomous and self-propelled vehicle or a group of self-propelled vehicles. This includes, for example, heavy-duty cargo trucks, utility- and special-purpose trucks or -vehicles, passenger cars and taxis, shuttle vehicles and buses, and non-autonomous cargo vehicles.

As an exemplary use case, the pilot vehicle may find the driverless vehicle waiting in a vehicle parking lot, connect to the driverless vehicle and control both vehicles' joint journey from the parking lot to the driverless vehicle's final destination. Typical advantages of a digital, software-based coupling of a vehicle controlled by a human driver to a driverless vehicle include, but are not limited to:

- Quicker connection and disconnection during operation, i.e. without stand-still while driving on the road;
- minimal risk of injuries during connecting and disconnecting;
- possible one-man handling in all situations;
- open connectivity, i.e. design of coupling fully independent from transport vehicle type, technical properties, and physical conditions;
- lightweight pilot vehicle, i.e. lower energy use on human driver-controlled trip legs;
- less parking space required for pilot vehicle;
- flexible, i.e. can be used to pick-up and drop off driver anywhere due to small size;
- improved cost efficiency of vehicle manufacturing and ease of use due to quick adaptation to right-hand-drive or left-hand-drive traffic through digitally controlled intra-lane positioning at no extra cost; and
- improved safety due to add-on emergency braking buffer from potentially increased clearance between pilot vehicle back-end and trailer front-end.

The present disclosure provides a solution that allows a human driver controlled vehicle to locate, identify, connect to and pilot another vehicle. For that purpose, the other vehicle is equipped with a suitable vehicle control system. The solution simulates or approximates the effects of a physical connection between a leading vehicle and one or more trailing vehicles in a convoy. The disclosure thereby enables a safe, secure, and reliable coupling independently of the physical nature and technical properties of the vehicles involved. It allows operation in various traffic conditions, road conditions and ambient conditions of a specific convoy.

Furthermore, the method as described herein anticipates full and unlimited responsibility and accountability of the human driver or the vehicle system in control of a pilot vehicle for safe driving of the convoy as would be the case if a physical connection was present between the vehicles. Corresponding rules may be presented and agreed upon during the initial identification and connection of pilot vehicle and driverless vehicle.

The method disclosed herein may be referred to as "collaborative drive control". It uses on-board digital data processing and digital vehicle-to-vehicle communication capabilities of digital vehicle systems as described herein.

The method relates to controlling a convoy including a pilot vehicle and a driverless vehicle. It includes electronically tethering the driverless vehicle to the pilot vehicle by establishing communication between a pilot vehicle control module and a driverless vehicle control module. It further includes receiving a longitudinal control user input in the pilot vehicle control module and communicating a longitudinal motion request from the pilot vehicle control module to the driverless vehicle control module. The longitudinal motion request is indicative of the longitudinal control user input. It further includes controlling a propulsion and braking system of the driverless vehicle in response to the longitudinal motion request received from the pilot vehicle and controlling a propulsion and braking system of the pilot vehicle, while tethered to the driverless vehicle, to maintain a target longitudinal clearance from the driverless vehicle.

The longitudinal control user input may include at least one of an accelerator pedal position and a brake pedal position. The longitudinal motion request may include at least one of a virtual accelerator pedal position, a virtual brake pedal position, a target torque, a target speed, a target acceleration, a percentage of maximum torque, a brake pressure, and a percentage of a maximum brake pressure.

The method may include recognizing an inability of the pilot vehicle to maintain the target longitudinal clearance from the driverless vehicle and, in response thereto, modifying an output of the propulsion and braking system of the driverless vehicle.

Controlling the propulsion and braking system of the pilot vehicle to maintain the target longitudinal clearance from the driverless vehicle may include determining, based on an output of a distance sensor which is arranged on the driverless vehicle, an actual longitudinal clearance between the pilot vehicle and the driverless vehicle. The method may further include calculating, in the driverless vehicle control module, a desired output of the propulsion and braking system of the pilot vehicle and communicating the desired output from the driverless vehicle to the pilot vehicle.

The actual longitudinal clearance between the pilot vehicle and the driverless vehicle may be the shortest longitudinal distance, parallel to a longitudinal axis of the driverless vehicle, between a front of the driverless vehicle and a rear of the pilot vehicle. Alternatively, the actual longitudinal clearance between the pilot vehicle and the driverless vehicle may be the radius of a smallest imaginary circle which extends around a defined point arranged within a footprint of the driverless vehicle to the pilot vehicle. In that case the defined point may be longitudinally arranged on a front of the driverless vehicle or rearwardly of a front of the driverless vehicle.

The actual longitudinal clearance between the pilot vehicle and the driverless vehicle may also be the semi-major axis of an imaginary ellipse which extends around a first defined point arranged on a center axis of the driverless vehicle to a second defined point arranged on a center axis of the pilot vehicle.

Controlling the propulsion and braking system of the pilot vehicle to maintain the target longitudinal clearance from the driverless vehicle may include determining, based on an output of a rearward facing distance sensor which is arranged on the pilot vehicle, an actual longitudinal clearance between the pilot vehicle and the driverless vehicle. The method may further include calculating, in the pilot vehicle control module, a desired output of the propulsion and braking system of the pilot vehicle based on the actual longitudinal clearance between the pilot vehicle and the driverless vehicle.

Controlling the propulsion and braking system of the pilot vehicle to maintain the target longitudinal clearance from the driverless vehicle may include calculating an adjusted accelerator pedal position and an adjusted brake pedal position in the driverless vehicle control module and communicating the adjusted accelerator pedal position and the adjusted brake pedal position to the pilot vehicle control module.

In another example, a method for controlling a convoy including a pilot vehicle and a driverless vehicle may include electronically tethering the driverless vehicle to the pilot vehicle by establishing communication between a pilot vehicle control module and a driverless vehicle control module and receiving a longitudinal control user input in the pilot vehicle control module. The method further includes selecting one of the pilot vehicle or the driverless vehicle as a selected vehicle to be controlled by the longitudinal control user input, the other being a not selected vehicle. It then includes controlling a propulsion and braking system of the selected vehicle in response to the longitudinal control user input and controlling a propulsion and braking system of the not selected vehicle to maintain a target longitudinal clearance from the selected vehicle.

In an initial state the driverless vehicle may be selected to be controlled by the longitudinal control user input. The method may further include recognizing an inability of the not selected vehicle to maintain the target longitudinal clearance from the selected vehicle and in response thereto switching the selection between the pilot vehicle or the driverless vehicle. This may be based on measuring an actual longitudinal clearance between the pilot vehicle and the driverless vehicle, comparing the actual longitudinal clearance with a minimum longitudinal clearance and a maximum longitudinal clearance, and switching the selection between the pilot vehicle or the driverless vehicle when the actual longitudinal clearance exceeds the maximum longitudinal clearance or the actual longitudinal clearance falls below the minimum longitudinal clearance.

The method may further include controlling a steering system of the driverless vehicle to follow a path of the pilot vehicle. The driverless vehicle may be operated in one of three modes, including a center-aligned mode in which, while driving straight, a center axis of the pilot vehicle and a center axis of the driverless vehicle are aligned, a left-aligned mode in which, while driving straight, a left side of the pilot vehicle and a left side of the driverless vehicle are aligned, and a right-aligned mode in which, while driving straight, a right side of the pilot vehicle and a right side of the driverless vehicle are aligned.

When used in combination with steering, the method may further include receiving a lateral control user input in the pilot vehicle control module, communicating a lateral motion request from the pilot vehicle control module to the driverless vehicle control module, the lateral motion request being indicative of the lateral control user input, controlling a steering system of the driverless vehicle in response to the lateral motion request received from the pilot vehicle, and controlling a steering system of the pilot vehicle, while tethered to the driverless vehicle, to follow a path of the driverless vehicle. This situation may e.g. apply while backing up a convoy normally lead by the pilot vehicle or describe a pilot vehicle pushing a driverless vehicle which is in front of the driverless vehicle.

A pilot vehicle suitable for use in the described methods includes a pilot vehicle control module. An accelerator pedal and a brake pedal are operatively connected to the pilot vehicle control module. The pilot vehicle has a propulsion and braking system. The pilot vehicle control module is configured to electronically tether the driverless vehicle to the pilot vehicle by establishing communication between the pilot vehicle control module and a driverless vehicle control module. The pilot vehicle control module is further configured to communicate longitudinal motion requests to the driverless vehicle control module, the longitudinal motion request being indicative of a position of the accelerator pedal and the brake pedal. The pilot vehicle control module is also configured to control the propulsion and braking system, while tethered to the driverless vehicle, to maintain a target longitudinal clearance from the driverless vehicle.

In another example, a method for controlling a plurality of connected vehicles is described. The vehicles form a convoy consisting of one, and only one, pilot vehicle with a human driver, and at least one driverless vehicle. The vehicles periodically exchange, via an electronic vehicle-to-vehicle communication, driving instructions determined to achieve desired states of driving in a convoy. The method includes:

1. Responsive to a confirmation from the human driver, a connection between the vehicles is established and maintained, via vehicle-to-vehicle communication, through connecting vehicle devices and integrating vehicle system operating system and functional processes in accordance with an agreed upon procedure for collaborative drive control.
2. The pilot vehicle human driver constantly determines a desired path and speed for the convoy in terms of longitudinal and lateral driving instructions set in order to modify both vehicles' path and speed in a coordinated and synchronized way.
3. The pilot vehicle and driverless vehicle periodically receive and store data on driving instructions and the vehicles' actual driving state.
4. Pilot vehicle human driver set driving instructions are adapted to pre-set parameters reflecting pre-set driving instruction constraints.
5. Prior to execution of pilot vehicle human driver-determined driving instructions, such driving instructions are selectively adjusted through employing specific controllers configured to achieve desired states of driving in a convoy.
6. The pilot vehicle and the driverless vehicle execute vehicle-specific driving instructions.
7. Upon the occurrence of connection-related events, including, but not limited to, initial connection of vehicles, re-connection of vehicles after a temporary disconnection, and final termination of the connection, vehicles generating, storing, and transmitting event records.
8. Upon the occurrence of a termination event, one or both vehicles terminating the connection between the vehicles.

Establishing a connection between the vehicles may include:
1.1 Presenting to a human driver information to be accepted and rules to be agreed upon during the initial identification and connection, containing but not limited to a set of driving instructions commonly available to all vehicles in the convoy, information of driverless vehicle properties regarding performance, component functions, safety instructions, risk from dangerous goods, and driving constraints.
1.2 The human driver confirming having received the information presented, approving the connection, and accepting responsibility and accountability for piloting the convoy.
1.3 Vehicles periodically assessing the validity of the connection between the vehicles.

Selective adjustment of driving instructions through employing specific controllers configured to achieve desired states of driving in a convoy, may comprise:
5.1 The vehicle with lesser longitudinal agility immediately executing human driver-set longitudinal driving instructions. A vehicle is considered to have lesser longitudinal agility, or being less agile than another vehicle, if its ability to accelerate falls below the other vehicle's ability to accelerate.
5.2 The vehicle with higher longitudinal agility executing human driver-set longitudinal driving instructions adjusted by employing a longitudinal clearance controller configured to achieve a desired target longitudinal clearance between the vehicles. A vehicle is considered to have higher longitudinal agility, or being more agile than another vehicle, if its ability to accelerate exceeds the other vehicle's ability to accelerate.
5.3 The leading vehicle immediately executing human driver-set lateral driving instructions.
5.4 The trailing vehicle executing human driver-set lateral driving instructions adjusted by employing a predictive controller configured to steer the path of the trailing vehicle close to the path of leading vehicle.

Storing, and transmitting event records, may include:
7.1 Recording event data containing but not limited to pilot vehicle identity information and driverless vehicle identity information, human driver identity, a time and date of the event, the geographical location of the event, and type of the event.
7.2 Storing the event record.
7.3 Transmitting the event record to another vehicle and to a remote server.

Terminating the connection between the vehicles may include either one of the following events:
8.1 Human driver initiated disconnection.
8.2 Disconnection events triggered by a vehicle system function or component, including but not limited to vehicle system irregularity handler functions,
driver assist systems or advanced driver assist system functions,
vehicles safety system or advanced vehicle safety system functions, and
autonomous driving system functions.

Periodically determining final longitudinal driving instructions for individual vehicles may include selecting the more agile vehicle and the less agile vehicle by assessing the relative longitudinal agility of the vehicles through measuring the change of the longitudinal clearance between the two vehicles.

Periodically determining final lateral driving instructions for individual vehicles may include determining the leading vehicle and the trailing vehicle by comparing a vehicles' actual position relative to the other vehicle in the motion path of the convoy.

The pilot vehicle may be capable of operating at different levels of driving autonomy, including
no automation, i.e. require the full-time performance by the human driver of all aspects of the dynamic driving task, even when enhanced by warning or intervention systems;
driver assistance, i.e. capable of the driving mode-specific execution by a driver assistance system of either steering or acceleration/deceleration;
partial automation; i.e. capable of the driving mode-specific execution by one or more driver assistance systems of both steering and acceleration/deceleration;
conditional automation, i.e. controlled by a vehicle control system capable of the driving mode-specific performance of all aspects of the dynamic driving task with the expectation that the human driver will respond appropriately to a request to intervene;
high automation, i.e. controlled by a vehicle control system capable of the driving mode-specific performance of all aspects of the dynamic driving task for many driving modes that can be managed by a human driver; and full automation, i.e. controlled by a vehicle control system capable of the driving mode-specific performance of all aspects of the dynamic driving task for all driving modes that can be managed by a human driver.

A system for controlling a convoy of vehicles by a host vehicle that is driven or accompanied by a human driver may include a database configured to create, store, update, retrieve, and delete data records. It may further include a plurality of vehicle sensors configured to detect information about the geographical position and orientation, speed, longitudinal acceleration, and lateral acceleration of the host vehicle and other vehicles. Sensors may also recognize indicated and potential changes to positions of other vehicles within a certain radius and distance in a particular direction in proximity of the host vehicle. Sensors may also detect states of technical components of the host vehicle and other vehicles, drivable surfaces (free space), lane markings, road signs, license plates, physical occurrences of other vehicles and other objects. Sensors may further capture ambient conditions including but not limited to road surface conditions, wheel grip, and wind force and direction. A user interface may be configured to communicate and interact with a human user. A communication interface may be provided through which the host vehicle can communicate with other vehicles and with a remote server. A memory may be configured to store instructions and data. A vehicle control interface may be provided through which the host vehicle can communicate with host vehicle electronic control units configured to execute host vehicle related driving instructions. A processor may be electronically coupled to the database, the memory, the vehicle control interface, the communication interface, and the vehicle sensors. The system may be electronically coupled to physical driver controls configured to enter driving instructions, and electronic control units embedded in vehicle components configured to execute driving instructions and generate feedback on the execution.

The processor may be configured to perform operations to control the host vehicle and another vehicle in collaboration with the processor of another vehicle system. Those operations may include receiving, storing, and interpreting data from host vehicle sensors regarding the driving state of the host vehicle and other vehicles. Data may include desired states of driving in a convoy, driving instructions related data recorded from human driver input into the pilot vehicle's physical controls, and data from host vehicle sensors measuring the longitudinal clearance between the host vehicle and another vehicle. In the context of this specification "storing data" is not meant to require a minimum time for which data is kept and includes short-term buffering of data in volatile memory. The processor may also be configured to detect and categorize drivable surfaces as well as objects and physical obstacles in the host vehicle's proximity by receiving and interpreting data from host vehicle sensors configured to identify such drivable surfaces, objects and physical obstacles. Sensor data may be received via a communication interface from other vehicles' vehicle systems. Data may be received via a communication interface from stationary sensors in the host vehicle's proximity. Data may also be received via a communication interface from a remote server. Furthermore, the processor may be configured to assess the safety risk of detected and categorized drivable surfaces and the collision risk of detected and categorized objects and physical obstacles. The processor may still furthermore be configured to assess the relative longitudinal agility of a vehicle compared to another vehicle by interpreting the change of longitudinal clearance data over time, determine driving instructions by employing rules of a longitudinal clearance controller and a predictive steering controller, and initiate the execution of driving instructions by the host vehicle. The processor may also be configured to generate, record, and transmit records containing data related to specified event prior to, during, or at termination of a connection.

In certain embodiments, the host vehicle processor may be configured to perform further operations in case a collaborative drive control connection is assessed invalid. Those operations include detecting an irregularity by analyzing data from vehicle sensors in accordance with rules stored in memory.

In yet other embodiments, the host vehicle's vehicle system may terminate the connection between the host vehicle's vehicle system and the other vehicle's vehicle system.

A vehicle system may be manually set to collaborative drive control mode by a human driver through a vehicle system's user interface intending to perform steps required to identify and connect pilot vehicle and driverless vehicle.

In another embodiment, collaborative drive control mode may be activated automatically by a pilot vehicle's vehicle system triggered either by pilot vehicle sensor detection of a driverless vehicle in its proximity, or by pilot order information received from a remote server or another vehicle system.

It may be a required prerequisite of finalizing a collaborative control mode connection, that the successful completion of the initial identification and connection process and any consequent re-connection be confirmed through a pilot vehicle's vehicle system user interface by a human driver. Pertaining such a confirmation, the human driver may explicitly confirm, having received, understood, and personally accepted all pre-conditions, requirements, constraints and other relevant facts regarding traffic safety, security, and traffic rule compliance arising from piloting the specific convoy, and in particular, all implications as to human driver responsibilities and accountability thereof.

In a certain embodiment, establishing and maintaining a connection between a host vehicle's vehicle system and another vehicle's vehicle system via vehicle-to-vehicle communication may require operatively connecting a wire to the vehicle systems' communication interfaces.

The path of a vehicle or a plurality of vehicles is understood to describe a line in a two-dimensional plane that a vehicle or a plurality of vehicles has moved along or is intending to move along. The path of a vehicle or a plurality of vehicles is understood to describe the time and position relationship of a vehicle or the plurality of vehicles. The path therefore includes direction (heading) and speed of a vehicle or a plurality of vehicles. Following a path of a leading vehicle thus refers to a trailing vehicle assuming, at a later time, the position at which the leading vehicle was at an earlier time. Generally, the leading vehicle and the trailing vehicle will proceed at approximately the same speed to maintain a constant distance from one another. Following the path of a leading vehicle need not be absolutely precise. The trailing vehicle may follow the path of a leading vehicle within an acceptable margin of error, e.g. within ±2 m lateral and ±5 m longitudinal offset.

Based on the role of a vehicle in a convoy, the vehicle with a human driver is referred to as "pilot vehicle", all other vehicles in a convoy are referred to as "driverless vehicle".

Based on the relative position of one vehicle to another vehicle on the convoy's path, the vehicle driving in front of the other vehicle will be referred to as "leading vehicle", the other vehicle will be referred to as "trailing vehicle".

When describing aspects of an embodiment from the perspective of one vehicle, that vehicle will be referred to as the host vehicle. When describing aspects of an embodiment from the perspective of a system, the vehicle hosting this system will be referred to as host vehicle.

The following detailed description of the invention is merely exemplary in nature and is not intended to limit the invention or the application and uses of the invention. Furthermore, there is no intention to be bound by any theory presented in the preceding background of the invention or the following detailed description of the invention.

BRIEF DESCRIPTION OF THE DRAWINGS

FIG. 2 is table diagram showing example, non-limiting embodiments of characteristic cases of pilot vehicle—driverless vehicle combinations in a convoy in accordance with various aspects described herein.

FIG. 4 is a table diagram illustrating an overview of collaborative drive control driving instruction determination in an example, non-limiting embodiment of the collaborative drive control method in accordance with various aspects described herein.

FIG. 13 is a table diagram explaining an example, non-limiting embodiment of vehicle system parameters to be set during initial identification and connection in accordance with various aspects described herein.

DETAILED DESCRIPTION

One or more embodiments are now described with reference to the drawings. In the following description, for purposes of explanation, numerous details are set forth in order to provide a thorough understanding of the various embodiments. It is evident, however, that the various embodiments can be practiced without these.

Figure 1:
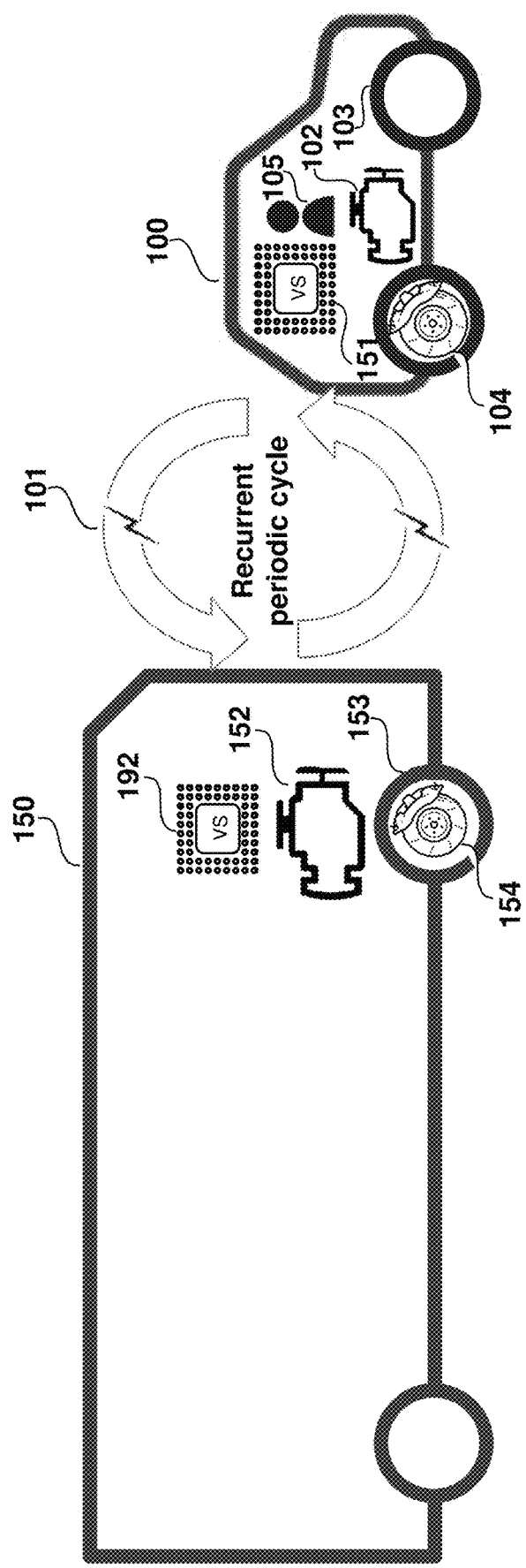
FIG. 1 is a schematic diagram illustrating an example, non-limiting embodiment of a collaborative drive control method in accordance with various aspects described herein, applied to a pilot vehicle and a driverless vehicle tethered together in a convoy.

FIG. 1 is a diagram illustrating an overview over an example, non-limiting embodiment of the collaborative drive control method as described herein. The collaborative drive control method is used to implement simultaneous drive control of a plurality of vehicles driving in a convoy, comprising one pilot vehicle 100 with a human driver 105, and at least one driverless vehicle 150. Collaborative drive control refers to a method for controlling a convoy including a pilot vehicle and a driverless vehicle in which the driverless vehicle and the pilot are electronically tethered to one another by establishing communication between a pilot vehicle control module 151 and a driverless vehicle control module 192.

The method includes periodic interaction between a host vehicle's vehicle system and another vehicle's vehicle system, leading to coordinated driving instructions that will ensure a coordinated, synchronized change of the path of all vehicles in the convoy.

The collaborative drive control method simulates or approximates the effects of a physical connection or coupling between a pilot vehicle and one or more driverless vehicles in a convoy through on-board digital data processing activities and digital vehicle-to-vehicle communication. By exchanging electronic messages in recurrent periodic cycles 101, a pilot vehicle control module 151 and driverless vehicle control module 192 may collaboratively adjust human driving instructions in such a way as to achieve desired states of driving in a convoy. This includes maintaining a target longitudinal clearance between the vehicles, maintaining a common path such that the trailing vehicle closely follows the leadings vehicle's path, and selecting a common path in terms of the time and position relationship of a vehicle.

Being electronically tethered to one another does not require any mechanical linkage between the pilot vehicle 100 and the driverless vehicle 150. However, being electronically tethered does not preclude the existence of such linkage either. Both the pilot vehicle 100 and the driverless vehicle 150 are self-propelled. The pilot vehicle 100 includes a pilot vehicle propulsion 102 and brake 104 system. The driverless vehicle 150 includes a separate propulsion 152 and brake 154 system. A possible mechanical linkage between the driverless vehicle 150 and the pilot vehicle 100 thus is not expected to serve as a traditional mechanical tractor-trailer connection.

Pilot vehicle driving instructions may be executed per periodic cycle by the pilot vehicle control module 151, instructing the pilot vehicle propulsion unit 102 and brake unit 104 to execute longitudinal instructions in terms of acceleration and steered wheels 103 to execute lateral driving instructions in terms of steering angle. The pilot vehicle propulsion unit 102 and brake unit 104 are components of a pilot vehicle propulsion and braking system.

Driverless vehicle driving instructions may be executed per periodic cycle by the driverless vehicle control module 192, instructing the propulsion unit 152 and brake unit 154 to execute longitudinal instructions in terms of acceleration and steered wheels 153 to execute lateral driving instructions in terms of steering angle. The driverless vehicle propulsion unit 152 and brake unit 154 are components of a driverless vehicle propulsion and braking system.

Referring now to FIG. 2, a table is shown describing case characteristics of example, non-limiting embodiments of cases in terms of pilot vehicle-to-driverless vehicle combinations in a particular convoy. Characteristics of specific vehicle combinations include:
1. Relation, i.e. number of pilot vehicles and driverless vehicles.
2. Vehicle types, i.e. technical properties and design characteristics of a vehicle specific to the vehicle's intended functions and purpose.
3. Driver controls type, i.e. technical nature of devices for input of driving instructions by a human driver.
4. Control while in convoy, i.e. human-machine share of control over driving instruction input.
5. Approach mode, i.e. convoy drive mode before connection while approaching to form or join a convoy.

Regular cases, marked in dark grey shading with the letter "R", are presumed to occur with higher frequency because of clearly favorable utility or benefit. A convoy consisting of a pilot vehicle with a human driver and a highway-only autonomous driverless vehicle may have the obvious advantage of enabling driverless semi-truck operation on highways which accounts for more than 50% of a semi-truck's total mileage and so provide a clear benefit over currently existing transportation services.

However, a convoy consisting of a pilot vehicle with a human driver and a fully autonomous driverless vehicle may reduce human truck driver cost only for a very small share of roads where very strict safety rules apply, or for highly dangerous goods transportation only. Such possible exceptions are marked in light grey shading with the letter "E". These cases are technically possible but will presumably be limited to exceptional situations in traffic and transportation.

Cases marked "NIP" are excluded due to technical incompatibility to the method as described herein.

Figure 3:
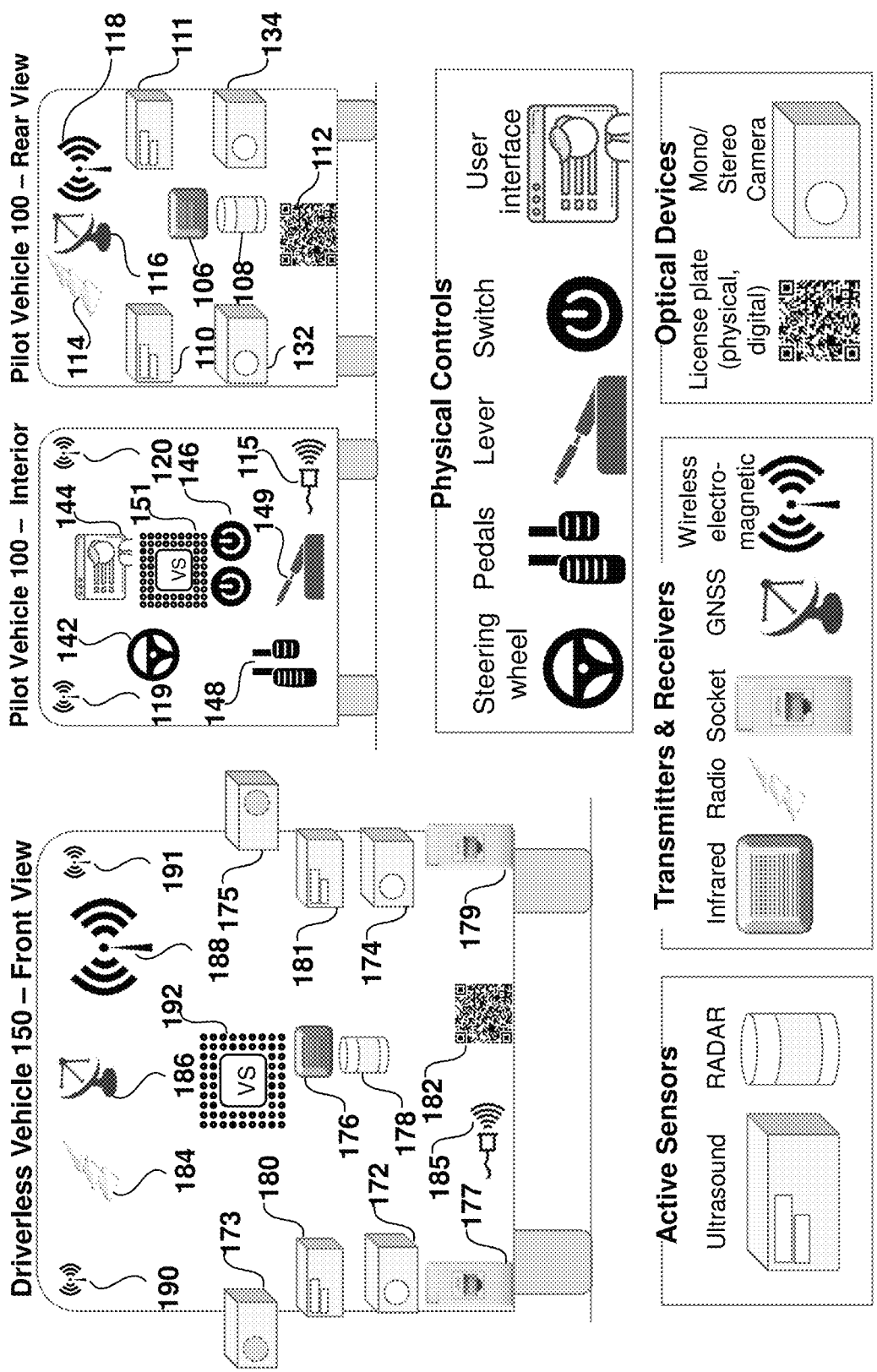
FIG. 3 is a block diagram illustrating example, non-limiting embodiments of vehicle system devices used while a vehicle system operates in collaborative drive control mode in accordance with various aspects of the method described herein.

FIG. 3 is a block diagram illustrating vehicle system devices which may be used while a vehicle system operates in collaborative drive control mode, including sensors, transmitters, receivers, optical devices physically mounted to a pilot vehicle 100 and a driverless vehicle 150, and their specific functions. A pilot vehicle is equipped to host a human driver. A driverless vehicle need not be required to host a human driver but still may be equipped to do so.

Pilot vehicle backward facing cameras 132, 134 may capture optical information to identify images and patterns, such as driverless vehicle's appearance, license plate and 3-dimensional coded identifiers of a plate 182. Optical information captured from the backward facing cameras 132, 134 may also be used to determine the pilot vehicle's relative position defined as the vehicle's geometric location relative to the geometric location of another vehicle driving in a convoy with the pilot vehicle.

A pilot vehicle active RADAR sensor 108 may measure the pilot vehicle's position relative to the driverless vehicle as well as their relative movements on vehicle-specific paths.

A pilot vehicle infrared transmitter and receiver 106 may transmit and receive digital data between the driverless vehicle's vehicle system in short range at low to medium transmission rate. The infrared transmitter and receiver 106 also may transmit and receive digital data to and from other vehicles in short range at low to medium transmission rate.

Pilot vehicle ultrasound active sensors 110, 111 transmit and receive ultrasonic beacons. Such beacons may be modulated to include identity information and a timestamp. Both ultrasound receivers may be present and configured to received ultrasonic beacons, the second ultrasound receiver being spatially separated from the first ultrasound receiver. Based on these time-of-flight differences of beacons and the received timestamp, a vehicle system may determine a relative position of the point of origin of the ultrasonic beacon.

A pilot vehicle Radio transmitter and receiver 114 may transmit and receive digital data directly over the air to and from other vehicles' vehicle systems in short to medium range at very high transmission rates, for example, via dedicated short range communication (DSRC).

A pilot vehicle wireless telecommunications transmitter and receiver 118 may transmit and receive digital data to and from other telecommunication participants in medium to long range.

Pilot vehicle wireless electromagnetic telecommunication transmitters and receivers 119, 120 transmit and receive Ultra-Wideband (UWB) messages. Such messages may be modulated to include identity information, a timestamp, time synchronization information, and/or a time-of-flight information. Both devices may be present and configured to receive Ultra-Wideband messages, the second device being spatially separated from the first device. Based on time-of-flight differences of the message received, a vehicle system may determine a relative position of the point of origin of the Ultra-Wideband message.

In addition, the pilot vehicle may also be equipped with a wide range of vehicle state sensors 115 capturing specific data including but not limited to
 vehicle state information such as, for example, vehicle speed, longitudinal acceleration, and lateral acceleration;
 vehicle component state information such as, for example, engine torque, engine or transmission rpm, and brake performance; and
 context conditions such as, for example, outside temperature, wind force, humidity.

A pilot vehicle plate 112 may provide unique identifier information for optical sensors. If implemented with digital technology, plate 112 may also present identity information ad-hoc.

Pilot vehicle physical controls may include a steering wheel 142, switches 146 (e.g. lighting, direction signal, hazard warning), brake and acceleration pedals 148 and a lever 149 (e.g. gear, parking brake). Those may receive driving instructions from a human driver. A user interface 144 may serve to interface between a human driver and the vehicle system for driving related input (e.g. driving constraints, setting of vehicle system parameters), driving related output (e.g. information on driving constrains, routing information, camera image streams, driving state of pilot vehicle and driverless vehicle), and digital connection-related information (e.g. driver identification and authentication, confirmation of digital connection, validation, precautionary warnings of an upcoming disconnect activity, disconnection alarm).

Depending on an operating mode, driving instructions can be directed at the pilot vehicle separately, at the driverless vehicle separately, or at both vehicles simultaneously. The pilot vehicle steering wheel 142 and the brake and acceleration pedals 148 may furthermore act as adaptive sensor-actuator units, i.e. receive and interpret information to limit driving instructions to certain values or within certain value ranges, and implement such constraints accordingly through
- adjusting output values from digital units of physical controls,
- limiting physical movement of physical controls, or increasing resistance of the controls' operation, and
- providing other forms of tactile feedback to the human driver.

A pilot vehicle global navigation satellite services (GNSS) antenna 116 may provide information required for geographic positioning.

A pilot vehicle control module 151 may perform operations of a vehicle control system or a similar electronic control unit, including receiving, generating, processing, and transmitting instructions directed at the pilot vehicle or a driverless vehicle to control the vehicle or one or more of the vehicle's components.

Driverless vehicle forward facing cameras 172, 174 may capture optical information to identify images and patterns, such as the pilot vehicle's appearance, license plate and 3D coded identifiers. Optical information captured from backward facing cameras 172, 174 may also be used to determine the pilot vehicle's convoy position defined as the vehicle's geometric location relative to the geometric location of another vehicle driving in a convoy with the driverless vehicle.

Driverless vehicle backward facing cameras 173, 175 may capture rear mirror-like images of backward traffic. Driverless vehicle's vehicle control system may transmit such images as video streams to the user interface of a connected pilot vehicle.

A driverless vehicle active RADAR sensor 178 may measure the driverless vehicle convoy position relative to the pilot vehicle as well as the vehicles' relative movements along their vehicle-specific paths.

Driverless vehicle ultrasound active sensors 180, 181 transmit and receive ultrasonic beacons. Such beacons may be modulated to include identity information and a timestamp. Both ultrasound receivers may be present and configured to received ultrasonic beacons, the second ultrasound receiver being spatially separated from the first ultrasound receiver. Based on these time-of-flight differences of the beacons and the received timestamp, a vehicle system may determine a relative position of the point of origin of the ultrasonic beacon.

A driverless vehicle infrared transmitter and receiver 176 may transmit and receive digital data to and from the pilot vehicle's vehicle system in short range at low to medium transmission rate. The infrared transmitter and receiver 176 may also transmit and receive digital data to and from other vehicles in short range at low to medium transmission rate.

A driverless vehicle radio transmitter and receiver 184 may transmit and receive digital data directly over the air to and from other vehicles' vehicle systems in short range to medium range at very high transmission rates, for example, via dedicated short range communication (DSRC).

A wireless telecommunication transmitter and receiver 188 may transmit and receive digital data to and from other telecommunication participants in medium to long range.

Driverless vehicle wireless electromagnetic telecommunication transmitters and receivers 190, 191 transmit and receive Ultra-Wideband (UWB) messages. Such messages may be modulated to include identity information, a timestamp, time synchronization information, and/or a time-of-flight information. Both devices may be present and configured to receive Ultra-Wideband messages, the second device being spatially separated from the first device. Based on time-of-flight differences of the message received, a vehicle system may determine a position of the point of origin of the Ultra-Wideband message.

In addition, the driverless vehicle may also be equipped with a wide range of vehicle state sensors 185 capturing specific data including but not limited to
- vehicle state information such as, for example, vehicle speed, longitudinal acceleration, and lateral acceleration;
- vehicle component state information such as, for example, engine torque, engine or transmission rpm, and brake performance; and
- context conditions such as, for example, outside temperature, wind force, humidity.

A driverless vehicle plate 182 may provide unique identifier information for optical sensors. If implemented with digital technology, plate 182 may also present identity information ad-hoc.

Driverless vehicle sockets 177, 179 may enable wire connection to the vehicle system for handheld or portable user interface devices.

A driverless vehicle global navigation satellite services (GNSS) antenna 186 may provide information required for geographic positioning.

A driverless vehicle system 192 may perform operations of a vehicle control system or a similar electronic control unit, including receiving, generating, processing, and transmitting instructions directed at the pilot vehicle or a driverless vehicle to control the vehicle or one or more of the vehicle's components.

In certain embodiments, a driverless vehicle may also be equipped with physical controls in order to host a human driver.

FIG. 4 is a table diagram illustrating an overview of collaborative drive control driving instruction determination. FIG. 4 illustrates an example, non-limiting embodiment of the collaborative drive control method as describe herein. In collaborative drive control as described herein, longitudinal driving instructions on the one hand and lateral driving instructions on the other hand are determined independently of each other, in that driving instructions are controlled by separate and functionally different controllers configured to adapt human driver instruction as required to achieve a desired state of driving in a convoy. Interactions between these controllers may occur only indirectly at two levels, comprising
1. the pilot vehicle human driver entering longitudinal and lateral motion requests simultaneously via pilot vehicle physical controls; and
2. the lateral driving instructions controller using the actual vehicle speed measured by vehicle sensors as input parameter to determine the trailing vehicle's steered wheels steering angle.

Under headline "Driving instructions", three columns are shown explaining the two generic types of driving instructions regarding a vehicle in forward or backward motion on roads, i.e. in a two-dimensional plane as listed in column "Type" list, that is longitudinal and lateral driving instructions. Column "Parameter" lists the specific parameters of the two generic types. Column "Physical control examples" names examples of typical physical controls of a vehicle through which a human driver can generate and enter driving instructions of the generic types.

Under headline "Selective adaptation of human driver-set parameter value" a unique approach applied in collaborative drive control is described. The collaborative drive control method may selectively adapt a pilot vehicle human driver-entered longitudinal and lateral driving instruction in such a way the two or more vehicles driving in a convoy are jointly controlled by only one human driver. The goal is to achieve the purpose in a highly efficient, fast, reliable, and safe way. In order to achieve its purpose and goal, the method presented here separates longitudinal from lateral driving instructions and applies two different techniques of driving instruction determination with fully independent parameters.

Longitudinal driving instructions are determined with the goal to achieve a set target longitudinal clearance between the vehicles as named in column "Target of controller function", similar to an inelastic or elastic physical coupling. The method comprises
- identifying the less agile vehicle, i.e. the vehicle with the lower actual longitudinal acceleration performance as named in column "Vehicle type determination", wherein the term "lower" is understood to describe a lower parameter value in case of positive acceleration, a higher parameter value in case of negative acceleration, i.e. deceleration, or an acceleration value of zero in case both vehicles show identical actual acceleration performance,
- instructing the less agile vehicle to execute longitudinal driving instructions as entered by the pilot vehicle human driver as described in column "Controller",
- as listed in column "Basic controller function", calculating or adjusting the driving instructions for the more agile vehicle in such a way that the targeted longitudinal clearance is achieved as described in column "Controller".

As potential further adjustment in certain embodiments, in order to provide for a more elastic coupling either one vehicle's or both vehicles' parameter values may be further adjusted, for example, to dampen critical oscillation of the overall longitudinal control system across both vehicles and/or to smooth shifts in acceleration values from one periodic cycle to another. For example, the driverless vehicle may be required to shift gears during acceleration which could lead to sudden and unexpected slow-down of the pilot vehicle, prohibitively disturbing the human driver.

Lateral driving instructions are determined with the goal of the trailing vehicle following the path of the leading vehicle as named in column "Target of controller function", similar to a physical coupling of a specific geometric length. The method comprises
- identifying the leading vehicle in the present periodic cycle, i.e. the vehicle in front of the other vehicle of the convoy's motion path, wherein the term "motion path" is understood to describe a path along which either both vehicles are intending to move in the same direction or one vehicle is intending to move in any direction while the other vehicle is intending to operate in stationary mode,
- instructing the leading vehicle to execute pilot vehicle human driver-entered lateral driving instructions as described in column "Controller",
- as listed in column "Basic controller function", deriving driving instructions for the trailing vehicle from the output of a model predictive controller configured to achieve the desired path following.

Thus, in collaborative drive control pilot vehicle human driver-generated lateral driving instructions are immediately released for execution to the leading vehicle without any further adjustment. However, it should be noted that for reasons of convenience or safety, the transmission rate from pilot vehicle's physical controls steering angle to the leading vehicle's steering angle may be fixed responsive to the steering geometry of the vehicles involved.

As potential further adjustment of trailing vehicle lateral driving instructions in certain embodiments, in order to avoid trailing vehicle collisions with physical objects or other obstacles on the pilot vehicle's path, arising from a different steering geometry and/or elapsed time of passing a certain waypoint, the controller may utilize vehicles safety system functions, autonomous driving functions, or similar advance functions, and take further sensor data into account to adjust the trailing vehicle's path accordingly.

By separating longitudinal from lateral control and by channeling longitudinal driving instruction adjustments in highly frequent periodic cycles according to the vehicles' actual longitudinal acceleration performance as immediately given output parameter, the collaborative drive control method presented here can generally disregard the need to predict longitudinal clearance calculated in complex functions of a plurality of input parameters like, for example, the vehicles' speed-dependent propulsion performance, torque curves, gear box shifts cycles, road inclination, ambient conditions, or mass. Thus, the method as presented here enables immediate and fast digital coupling of vehicles of highly different type, performance, technical state etc. The only prerequisite both vehicles must fulfill is longitudinal and lateral drive-by-wire capability as well as specifications of the vehicle systems' operating systems in line with collaborative drive control requirements.

Now turning to FIG. 5a-d, a schematic depiction of example, non-limiting embodiments of measurement specifications for longitudinal clearance (LC) between two vehicles are shown.

In general, the definition of longitudinal clearance between a leading vehicle and a trailing vehicle depends on respective use cases and available measurement technologies (e.g. UWB, radar). Examples entail:
- Euclidian distance between the mid of the front end of the trailing vehicle and the mid of the rear end the leading vehicle
- Euclidian distance between the left front corner of the trailing and the left rear corner of the leading vehicle compared with the left front corner of the leading vehicle and the left rear corner of the leading vehicle, whatever is shorter
- Euclidian distance between the mid points of both vehicles minus two half lengths of both vehicles.

The goals of achieving a target longitudinal clearance may include:
1. Avoid unneeded convoy interruptions from other traffic participants by narrowing clearance as much as possible under consideration of goal 2.

2. Avoid pilot vehicle—driverless vehicle collision by providing for a speed-dependent reaction time sufficient to avoid a collision at a given speed, in case of emergency driving instructions.
3. Avoid device range-caused communication failure due to too long a distance between vehicles' communication devices.

Thus, the measurement of longitudinal clearance may be specified depending on factors as for example type, technical properties, steering geometry, size, purpose, use of a specific combination of vehicles, drive modes, and direction of motion. The specification may further be changed during collaborative drive control operation if required.

Figure 5B:
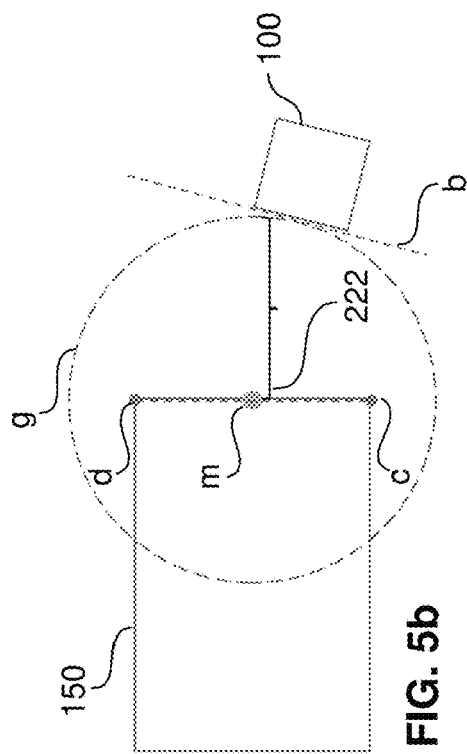
FIGS. 5a-5d are schematic diagrams depicting example, non-limiting embodiments of measurement specifications for longitudinal clearance between two vehicles in accordance with various aspects described herein.
Figure 5D:
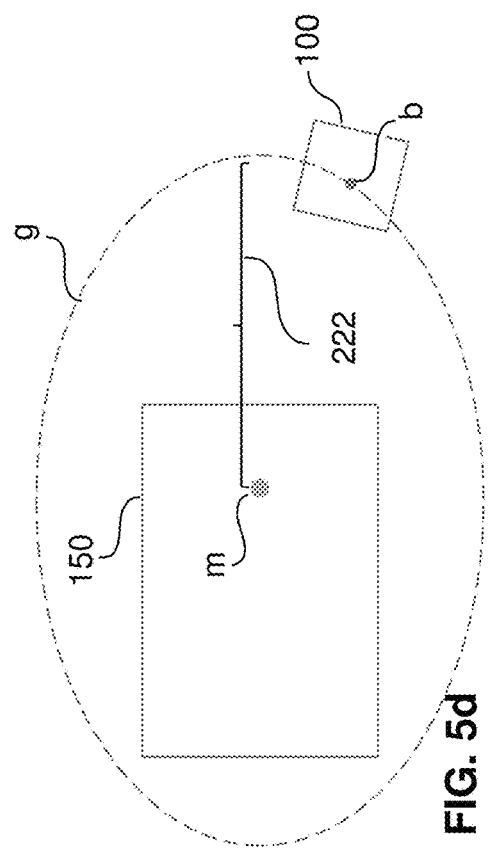
Figure 5A:
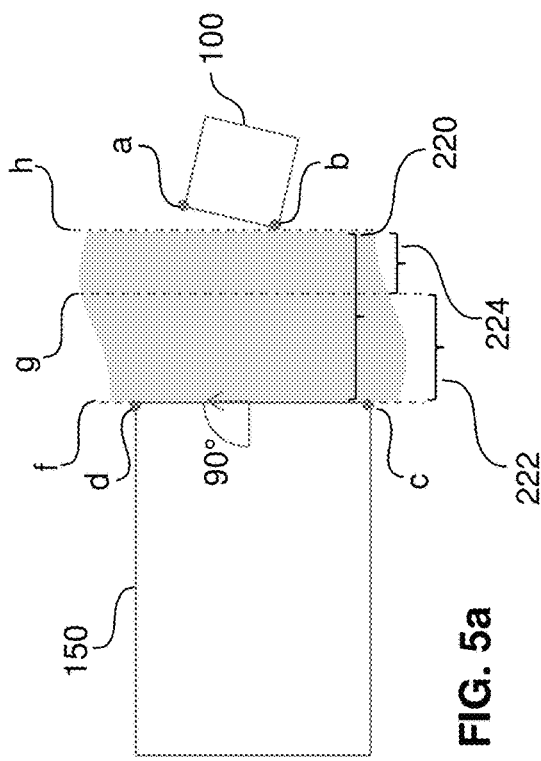

In FIG. 5a, the longitudinal clearance between the driverless vehicle 150 and the pilot vehicle 100 is measured by the minimal value for the distance between line l(c,d) to point a, and line l(c,d) to point b. Actual longitudinal clearance $LC_{actual}$ is depicted by French bracket 220 between dotted lines f and h. Target longitudinal clearance $LC_{target}$, depicted by French bracket 222 between dotted lines f and g, can be equal, lower, or larger than actual longitudinal clearance at any given time during collaborative drive control operation.

The difference between $LC_{actual}$ and $LC_{target}$ is depicted by French bracket 224 between lines g and h. In the case shown here, actual longitudinal clearance is larger than target longitudinal clearance and, thus, should be reduced towards target clearance by adjusting the acceleration values of one or both vehicles accordingly.

In FIG. 5b, the target longitudinal clearance 222 is measured from the point m in the middle of lateral front line of driverless vehicle 150 marked by dotted line l(c,d) and the tangent of circle g around point m and marked by dotted line b.

Figure 5C:
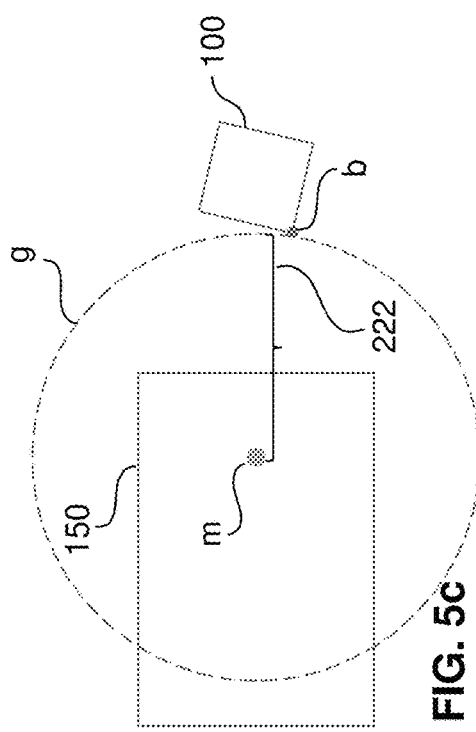

In FIG. 5c, the target longitudinal clearance 222 is measured as circle g around point m inside the horizontal frame or footprint of the driverless vehicle 150 to the nearest rear corner b of the pilot vehicle 100.

In FIG. 5d, the target longitudinal clearance 222 is measured as elliptic shape g around point m inside the horizontal frame or footprint of driverless vehicle 150 to point b inside the frame or footprint of the pilot vehicle 100.

A wide variety of measurements and any combinations thereof are possible, and the variants target clearance, actual clearance, as minimum clearance and maximum clearance may also be specified in such a variety of concepts. Note that at any given time, specification must be identical across the vehicles involved in order to achieve the goals mentioned before.

Figure 6:
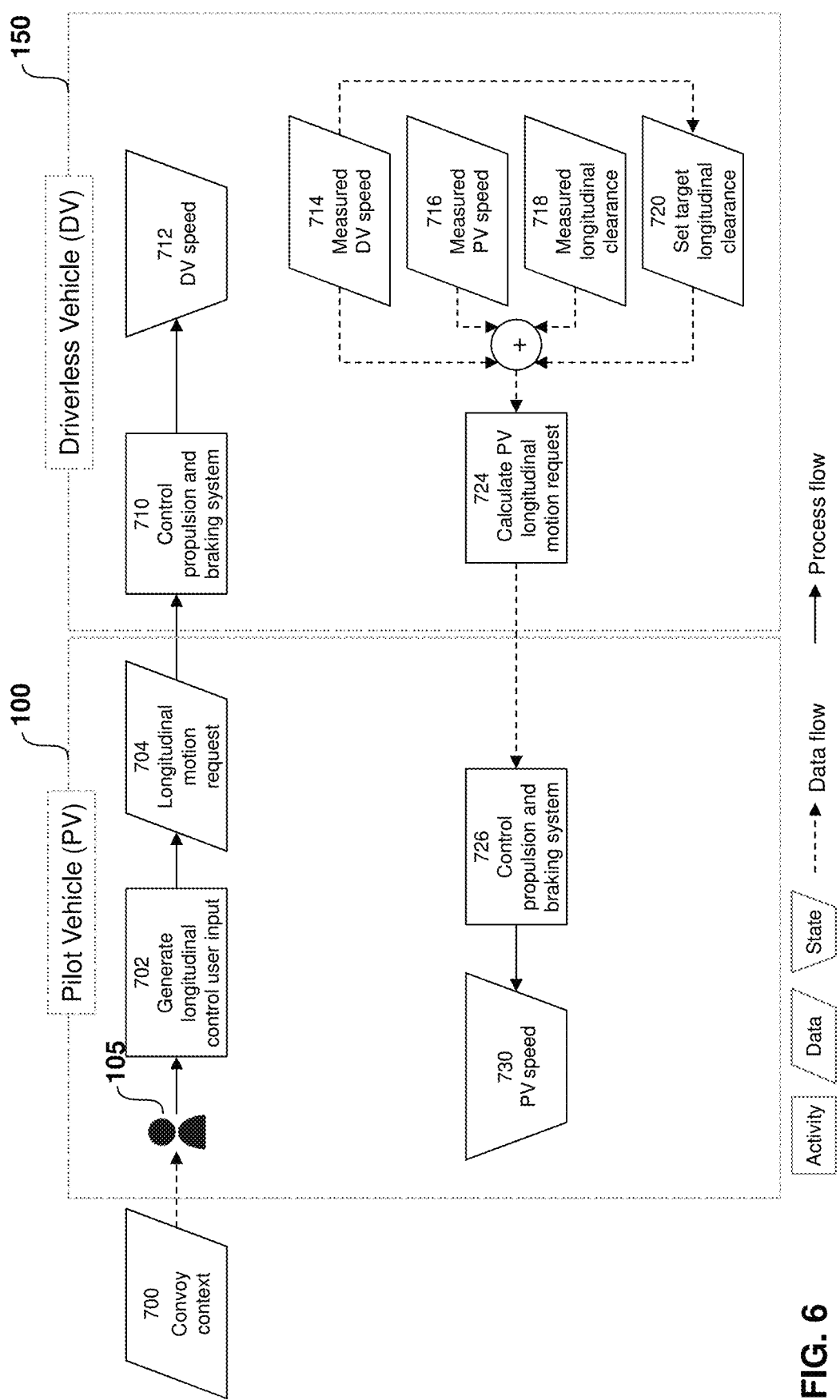
FIG. 6 is a block diagram describing an example, non-limiting embodiment of the method in accordance with various aspects described herein.

Now turning to FIG. 6, a flow chart of an example, non-limiting embodiment of the method for controlling a convoy including a pilot vehicle and at least one driverless vehicle is shown. Known methods of managing vehicles in a convoy are complicated, time-consuming, and require error-prone functions for estimating specific vehicles' driving dynamics and predicting vehicle driving states during convoy operation, for example estimations of vehicle mass, engine torque values, braking performance, physical control latency, etc. These disadvantages can be eliminated by
  controlling the propulsion and braking system of the vehicle that at a given time is actually capable of relatively lesser longitudinal acceleration performance, in response to the longitudinal motion request received from the pilot vehicle, and
  controlling the propulsion and braking system of the vehicle that at a given time is actually capable of relatively higher longitudinal acceleration performance, to maintain a target longitudinal clearance between the convoy vehicles.

Acceleration can be a positive or negative value. Acceleration performance thus relates to both increasing a vehicle's speed and decreasing a vehicle's speed.

In the embodiment shown in FIG. 6, the pilot vehicle 100 is assumed to be the vehicle that at a given time is capable of relatively higher longitudinal acceleration performance compared to the driverless vehicle 150. Thus, the driverless vehicle's propulsion and braking system is directly controlled by pilot vehicle control user input, whereas the pilot vehicle's propulsion and braking system is controlled by a longitudinal clearance controller in such a way that a target longitudinal clearance from the driverless vehicle is maintained.

Any controlling activity may start with a convoy context 700, including
  desired and requested convoy properties, as for example, time of arrival, maximum speed, and scheduled route, and
  current convoy conditions, as for example actual speed, traffic conditions, traffic rules, behavior of other vehicles and traffic participants in the convoy's immediate proximity, road conditions, and ambient conditions.

Considering such convoy context, the pilot vehicle's human driver 105 may generate a longitudinal control user input 702, typically by adjusting an accelerator pedal position or a brake pedal position. A longitudinal motion request value 704 may be derived from the control user input 702. The longitudinal motion request 704 may include a target speed and a target acceleration.

The driverless vehicle 150 may execute the longitudinal motion request 704 by controlling its propulsion and braking system 710. Controlling the driverless vehicle's propulsion and braking system may include translating the longitudinal motion request 704 into driverless vehicle specific commands, but typically does not include any adjustment or adaptation of the underlying requested target speed or target acceleration. The driverless vehicle's propulsion and braking system causes the driverless vehicle to assume a driverless vehicle speed 712.

The pilot vehicle 100 is not directly controlled by the longitudinal control user input 702 or the derived longitudinal motion request 704. Rather, the pilot vehicle's propulsion and braking system is part of a closed loop control. A longitudinal clearance controller calculates a pilot vehicle longitudinal motion request 724, which is a target value of the pilot vehicle speed or acceleration. The closed loop control is based on the following inputs:
  Measured driverless vehicle speed 714,
  measured pilot vehicle speed 716,
  measured longitudinal clearance 718, and
  target longitudinal clearance 720. The target longitudinal clearance may be variable and based on the driverless vehicle speed.

The pilot vehicle propulsion and braking system 726 is controlled based on the closed loop control so that the pilot vehicle assumes a pilot vehicle speed 730.

The longitudinal clearance controller calculating pilot vehicle longitudinal motion request 724 is configured such that the actual longitudinal clearance $LC_{actual}$ between these vehicles will approach a set target longitudinal clearance $LC_{target}$, i.e. the difference between $LC_{actual}$ and $LC_{target}$ will be minimized. This principle applies to both positive and negative acceleration values.

The longitudinal clearance controller uses two main parameter values as input
1. Longitudinal clearance error value in meters, i.e. deviation of actual clearance from desired clearance $$LC_{error} = LC_{actual} - LC_{target}$$

2. Relative Speed between both vehicles [in meters per second], $$v_{rel} = v_{PV} - v_{DV}$$

Both inputs lead to an adjustment coefficient $A_{adj}$ for adjusting the speed of the pilot vehicle relative to the actual speed of the driverless vehicle in such a way that the error value $LC_{error}$ is minimized. A, B and C are coefficients that may be tuned to achieve a desired elasticity of the simulated physical coupling between the vehicles. In certain embodiments, such coefficients may be determined depending to the vehicles' speed in order to achieve varying levels of elasticity responsive to speed.

$$\lambda_{adj,LC_{error}} = A \cdot \frac{LC_{error}}{\text{abs}(LC_{error})} \cdot \left( \frac{\text{abs}(LC_{error})}{LC_{actual} + LC_{error}} \right) c$$

$$\lambda_{adj,v_{rel}} = B \cdot \left( \frac{v_{rel}}{\text{abs}(v_{rel})} \cdot \frac{v_{rel}}{v_{PV}} \right) c$$

$$\lambda_{adj} = \lambda_{adj,LC_{error}} + \lambda_{adj,v_{rel}}$$

The resulting adjusted speed set point of the pilot vehicle can be derived as follows:

$$v_{PV,adj} = v_{DV} \cdot (1 + \lambda_{adj})$$

In another embodiment, in case the longitudinal target value may be expressed by acceleration, the respective adjusted acceleration set-point of the pilot vehicle $a_{PV,adj}$ may be derived from the adjusted speed set point, where $t_{response}$ represents the desired time span during which at the time of the adjustment the target speed will be reached.

$$a_{PV,adj} = a_{DV} + \frac{v_{PV,adj} - v_{PV}}{t_{response}}$$

In case of resulting negative acceleration values, the longitudinal clearance controller or the pilot vehicle control module may determine whether the pilot vehicle reaching such negative acceleration value requires reducing pilot vehicle propulsion power alone or additionally applying the pilot vehicle's braking system.

In other embodiments, the driverless vehicle may be the vehicle that at a given time is actually capable of relatively higher longitudinal acceleration performance. In this case, the pilot vehicle may immediately use the longitudinal motion request 704 for execution instead of a controller-determined longitudinal motion request, and the driverless vehicle may use a longitudinal clearance controller determined driverless vehicle longitudinal motion request for execution.

Figure 11:
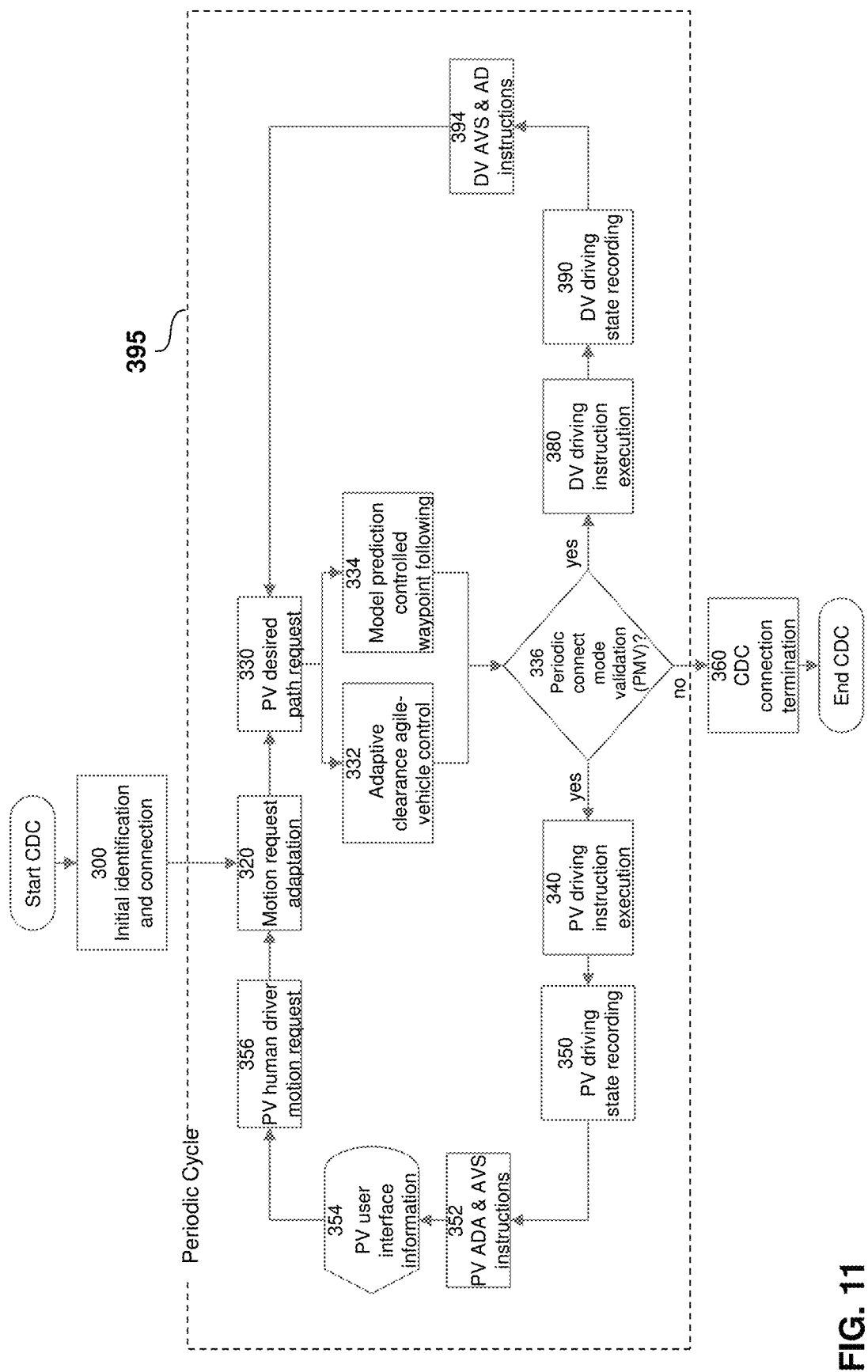
FIG. 11 is a sequence diagram describing an example, non-limiting embodiment of the collaborative drive control method in accordance with various aspects described herein.

In certain embodiments, speed or acceleration set points may be subject to adjustments, as for example, to set driving parameter values, set or scheduled constraints for driving instructions dependent or independent of the actual driving state, Advanced Driver Assistant System function input, Autonomous Driving System function input, or Advanced Vehicle Safety System function input, as shown in FIG. 11.

In other embodiments, the closed loop control of the pilot vehicle need not be in form of a desired pilot vehicle acceleration or pilot vehicle speed. but may communicate an adjustment value relative to the longitudinal control user input as will be explained in FIG. 18.

Figure 7:
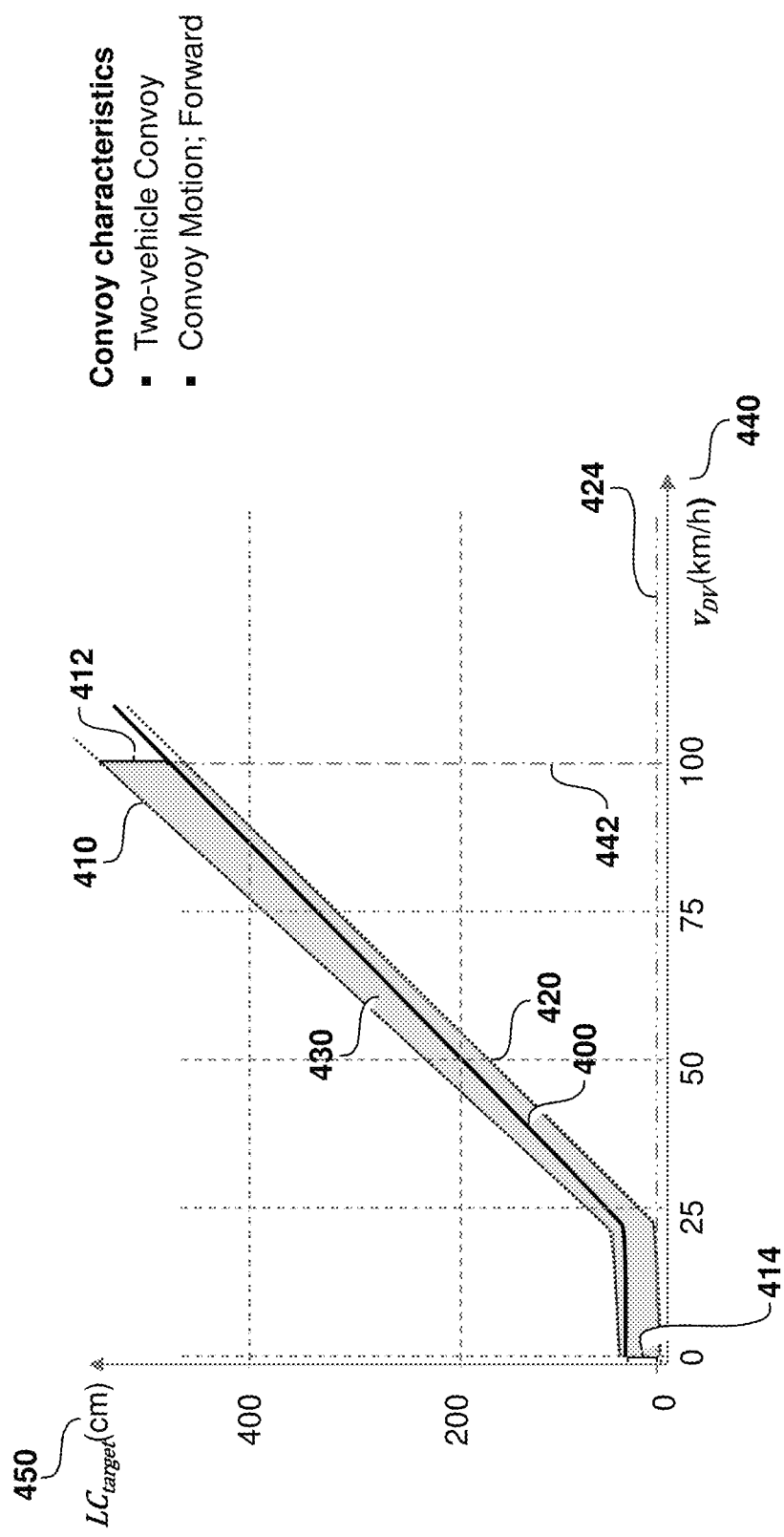
FIG. 7 is a function graph diagram illustrating example, non-limiting embodiments of a function for controlling longitudinal clearance in accordance with various aspects described herein.

Now turning to FIG. 7, a function graph diagram is shown illustrating example, non-limiting embodiments of a function for controlling longitudinal clearance in response to vehicle's actual speed $v_{DV}$. In particular, a function is shown of speed-dependent clearance control with a positive correlation between x-axis depicted driverless vehicle speed 440 and y-axis depicted longitudinal clearance 450 between pilot vehicle and driverless vehicle for a convoy of two vehicles in forward motion. The function is shown for all speed levels between 0 km/h and maximum convoy speed of 100 km/h marked by double-broken vertical line 442. Bold solid line 400 depicts speed-dependent target longitudinal clearance $LC_{target}$.

A positive correlation between driverless vehicle speed and $LC_{target}$ may be required to ensure sufficient safety clearance for rear-collision avoidance in case of hard braking or emergency braking. At low speed levels below 20 km/h clearance may be marginal due to low reaction time required for collision avoidance between leading and trailing vehicles. Low clearance may help to avoid frequent convoy interruptions from other traffic participants. A convoy interruption is understood to describe a state where another traffic participant, i.e. not participating in a convoy, is physically positioned between a leading and a trailing vehicle of a convoy. With increasing speed target clearance may increase because of growing safety clearance required for collision avoidance and decreasing risk of convoy interruptions.

In order to account for expected brake performance-induced variations in required safety clearance, the $LC_{target}$ function's shape, slope, and boundaries may be set for a specific convoy responsive to
  technical properties of one or more convoy vehicles, including among others total weight, and brake performance,
  road conditions, and
  ambient conditions.

Dotted line 410 depicts the upper boundary and dotted line 420 the lower boundary of a valid longitudinal clearance range. French bracket 412 marks the maximum valid upper range, i.e. difference between upper boundary 410 and $LC_{target}$ 400, French bracket 414 marks the maximum valid lower range, i.e. difference between $LC_{target}$ 400 and lower boundary 420. Double-broken horizontal line 424 marks the minimum LC.

Upper and lower boundaries may be set to account for irregularities as for example emergency braking, sudden changes of road conditions or ambient conditions, or convoy interruptions. When approaching a boundary value, the longitudinal clearance controller may adjust coefficients order to increase the rate of change of $LC_{error}$ as explained in FIG. 6.

Upon reaching a boundary value, the longitudinal clearance controller may immediately invoke an irregularity handler or any comparable controller capable of ensuring convoy safety.

Margins between $LC_{target}$ 400 and upper boundary 410 may depend on speed level. At lower speed a narrower upper margin may be required to reduce the risk of convoy interruptions. Also, in other embodiments, margins between $LC_{target}$ 400 and lower boundary 420 may depend on speed level. At higher speed levels lower margins may be required to reduce the risk of disconnection due to technical issues as, for example reduced sensor visibility from unfavorable ambient conditions.

In further embodiments, a fixed or function-determined maximum longitudinal clearance may be set.

In still further embodiments, depending on various determinants, as for example compliance to technical property-specific traffic rules, locally specific traffic rules, traffic-specific safety precautions, and cargo-specific safety precautions, the graph of the LC function and associated upper and lower boundaries may differ regarding slope, gradients, shape, end points, etc. In still further embodiments, $LC_{target}$ may not be a function of speed but a function of sensor ranges, technical state of braking related components, specific traffic rules, or a combination thereof.

Furthermore, $LC_{target}$ and boundaries may vary during collaborative drive control operation in accordance with the specified method of measuring longitudinal clearance as shown, for example, in FIG. 5c with a change of the relative orientation of the vehicles.

Figure 8:
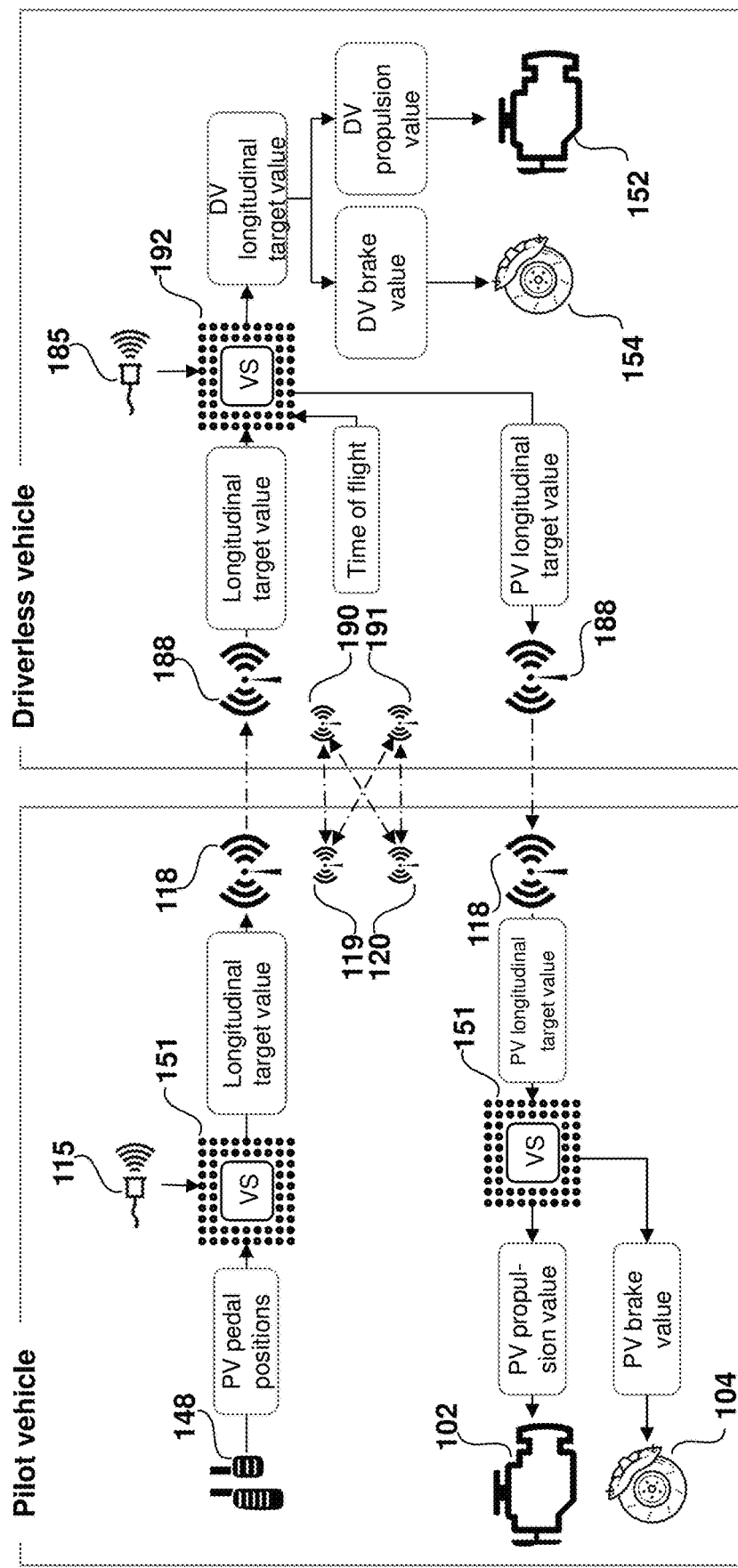
FIG. 8 is a block diagram illustrating an example, non-limiting embodiment of the collaborative drive control-specific interaction between two vehicles in accordance with various aspects described herein.

Referring now to FIG. 8 a block diagram is shown illustrating an example, non-limiting embodiment of the collaborative drive control-specific interaction between two vehicles driving in a convoy, both either in forward- or in backward motion. The interaction includes periodically determining and executing longitudinal driving instructions. In the embodiment described herein, the pilot vehicle is the vehicle that at a given time is actually capable of relatively higher longitudinal acceleration performance. In other embodiments the driverless vehicle may be the vehicle that at a given time is actually capable of relatively higher longitudinal acceleration performance.

In order to follow a continuous vehicle path all or selected steps of the process described here may be repeated in periodic cycles. Cycles may be synchronized with the lateral driving instructions determination process as will be explained in FIG. 10.

Pilot vehicle longitudinal control user input expressing a longitudinal motion request may be received from pilot vehicle controls 148. Typically, but not necessarily, such input consists of an acceleration pedal and a brake pedal position. The corresponding pedal position value is transmitted via wired or wireless connection to the pilot vehicle control module 151.

In parallel, the pilot vehicle control module 151 may constantly receive data from a plurality of state sensors 115, required for assessing relative longitudinal acceleration performance and determining longitudinal motion requests. Such data may include the vehicle's speed and longitudinal acceleration.

The pilot vehicle control module 151 may derive from the longitudinal control user input a longitudinal target value, including at least one of a target speed set point and a target acceleration set point. The convoy longitudinal target value is one example of a longitudinal motion request. The pilot vehicle may transmit the value via a pilot vehicle telecommunication transmitter and receiver 118 and a driverless vehicle telecommunication transmitter and receiver 188 to a driverless vehicle control module 192.

The driverless vehicle control module 192 may periodically receive and record driving state data required for calculating an actual longitudinal clearance. The actual longitudinal clearance may be determined by measuring time-of-flight differences between time-synchronized messages between pilot vehicle Ultra-Wideband sensors 119, 120 and driverless vehicle Ultra-Wideband sensors 190, 191. Alternatively, any other suitable sensor configuration including LIDAR, RADAR, and ultrasound sensors may be used. Sensor raw data and/or actual longitudinal clearance derived thereof may be stored in memory as stored driving state data or processed for real-time use.

In parallel, the driverless vehicle control module 192 may constantly receive data from a plurality of state sensors 185, required for assessing actual longitudinal acceleration performance and determining longitudinal motion requests. Such data may include the vehicle's speed and longitudinal acceleration.

Next, the driverless vehicle control module 192 may use the received longitudinal target value as its driverless vehicle longitudinal target value, and translate it into a driverless vehicle propulsion system-specific propulsion value, as for example, torque, electrical power, or signal frequency, to be transmitted to the propulsion system for execution, and a driverless vehicle braking system-specific brake value to be transmitted to the braking system for execution.

Execution may be performed through the driverless vehicle control module 192 directly or through electronic control units associated with the propulsion system 152 and the braking system 154.

In parallel, the driverless vehicle control module 192 may determine a pilot vehicle longitudinal target value including at least one of an adjusted acceleration value and an adjusted speed set point for the pilot vehicle required to achieve a set target longitudinal clearance $LC_{target}$.

In certain embodiments, the longitudinal target values may be subject to adjustments, as for example, set driving parameter values, set or scheduled constraints for driving instructions dependent or independent of the actual driving state, Advanced Driver Assistant System function input, Autonomous Driving System function input, or Advanced Vehicle Safety System function input.

The driverless vehicle control module 192 may transmit the pilot vehicle longitudinal target value via a driverless vehicle telecommunication transmitter and receiver 188 and pilot vehicle telecommunication transmitter and receiver 118 to the pilot vehicle control module 151. The pilot vehicle control module 151 may receive and translate the longitudinal target value for the pilot vehicle into a pilot vehicle propulsion system-specific propulsion value, as for example, torque, electrical power, or signal frequency, to be transmitted to the propulsion system for execution, and a pilot vehicle braking system-specific brake value to be transmitted to the braking system for execution.

Execution may be performed through the pilot vehicle control module 151 directly or through electronic control units embedded in propulsion system 102 and braking system 104.

In another embodiment, instead of or parallel to the driverless vehicle control module 192 periodically calculating longitudinal clearance, the pilot vehicle control module 151 may periodically calculate or capture such values based on its own sensor readings and transmit longitudinal clearance together with the longitudinal target value via telecommunication receivers and transmitters 118, 188 to the driverless vehicle control module 192.

In still another embodiment, the driverless vehicle control module 192 may determine an adjusted longitudinal target value including at least one of an adjusted acceleration value and an adjusted speed set point for both vehicles in order to achieve target longitudinal clearance faster.

In accordance with the vehicle system operating parameters set upon connection, any of the tasks described and required for assessing relative longitudinal performance and determining longitudinal motion requests of any one of the vehicles involved may be performed by either one or in a distributed architecture even by more than one of the vehicle systems involved.

Furthermore, the interaction as described here may be contingent to specific prerequisites and conditions, as for example, a valid digital connection between vehicles.

Figure 9:
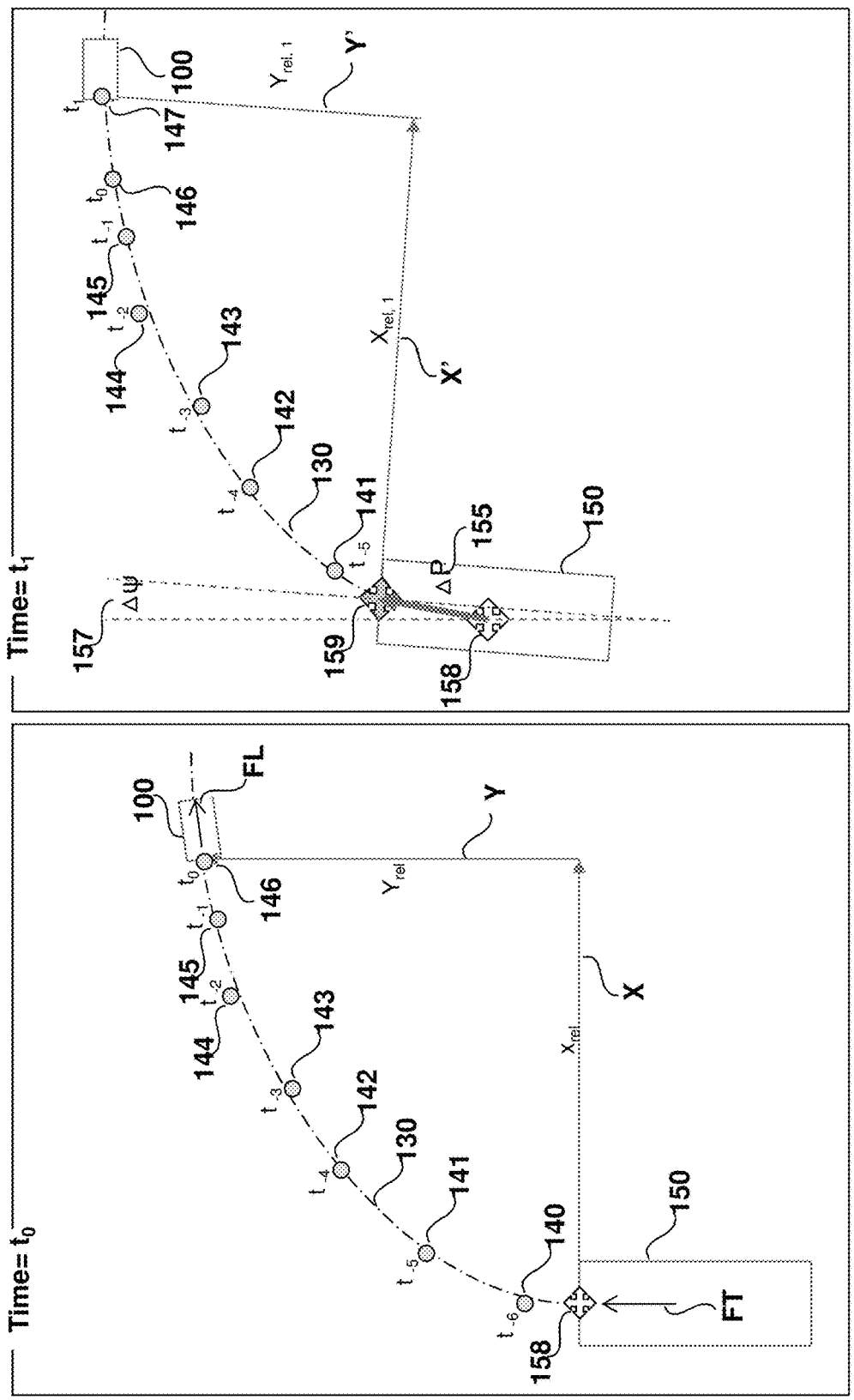
FIG. 9 is a geometric diagram illustrating an example, non-limiting embodiment of a model predictive controller function for lateral driving instruction determination in accordance with various aspects described herein.

FIG. 9 is a geometric diagram illustrating an example, non-limiting embodiment of the model predictive controller function for lateral driving instruction determination.

In collaborative drive control, pilot vehicle human driver-generated lateral driving instructions are immediately released for execution to the leading vehicle without any further adjustment. However, it should be noted that for reasons of convenience or safety, the transmission rate from pilot vehicle's physical controls steering angle to the leading vehicle's steering angle may be fixed responsive to the steering geometry of the vehicles involved.

The trailing vehicle's steering angle is determined by a controller configured to achieve the trailing vehicle following the path of the leading vehicle. During each recurrent periodic cycle, the relative position of the leading vehicle to the trailing vehicle is measured as input for such controller. The relative positions are recorded and stored in memory as waypoints, describing the path on which the trailing is supposed to follow the leading vehicle In box "Time=$t_0$" the leading vehicle 100 is shown moving in forward direction FL, and the trailing vehicle 150 is shown moving in forward direction FT. Both vehicles are depicted in a relative coordinate system 158 aligned with trailing vehicle's longitudinal and lateral axis. The leading vehicle's coordinates relative to the trailing vehicle are determined by arrows X, depicting distance $X_{rel}$ on the relative coordinate system's X-axis, and Y, depicting distance $Y_{rel}$ on the relative coordinate system's Y-axis. Gray points 140 to 146 depict waypoint that the leading vehicle 100 has passed through in time $t_{-5}$ to $t_0$ according to corresponding data derived from vehicle sensors.

In order to address the fact that the trailing vehicle is moving, i.e. the relative coordinate system within the absolute geometric space is rotated and shifted, the resulting array of waypoints is rotated and shifted in each cycle to such an extent that is equivalent to the trailing vehicle's motion since the last cycle. Box "Time=$t_1$" depicts both vehicles and respective measurements during the next periodic cycle in a shifted and rotated coordinate system 159 after having moved forward. The shift, i.e. difference in position is marked by bold arrow 155, rotation is marked by angle 157. Locating a new waypoint 147 inside the shifted and rotated coordinate system delivers the trailing vehicle's new relative position given by a vector $X_{rel}$, 1 on X-Axis X' and a vector $Y_{rel}$, 1 on Y-axis Y'.

Note that the measured waypoints as well as the trailing vehicle's measured shifting and rotating motion may be subject to measurement errors. In order to make the model predictive controller algorithm robust against inaccurate measurements, a cubic polynomial fit curve depicted by dash-dotted line 130 is used as an approximation of the actual path to follow.

To determine necessary changes of the trailing vehicle's steering angle, required to following the waypoints as accurately as possible, a standard model predictive controller algorithm is used. The advantage of a model prediction controller over traditional controllers such as proportional-integral-derivative controllers is that model prediction controllers also consider future steering angle values to determine the best current steering angle value which makes the algorithm very robust against any kind of steering scenario.

The model predictive controller algorithm may comprise the following components:

Trailing vehicle driving state information, including
    i. Location of the vehicle (x, y)
    ii. Speed v
    iii. Orientation $\psi$
    iv. Trailing vehicle steered wheels steering angle $\delta$
    v. Longitudinal acceleration a
    vi. Predicted cross-track error cte, and
    vii. Predicted orientation error $e\psi$;

The model predictive controller works as follows:

In each recurrent periodic cycle at a frequency of 20-50 ms, the current state of the trailing vehicle 150 and the cubic polynomial fit curve 130 is determined. The current state of the trailing vehicle 150 comprises speed, orientation, steering angle, and longitudinal acceleration. Additionally, two errors at current state are being calculated, i.e. the cross-track error, describing the shortest distance of the trailing vehicle 150 to the fit curve and the orientation error, describing the difference of the tangent of the fit curve at the nearest point from the trailing vehicle with the orientation of the vehicle.

The location of the trailing vehicle 150 is set to origin [0, 0] as the fit curve has been rotated and shifted to a coordinate system with origin at the trailing vehicle as well.

From the initial state, the controller algorithm now simulates various driving scenarios based on the kinetic model shown and determines the value of the cost function for each scenario. The model constraints are hard constraints for the algorithm. The actual solver solves the respective convex optimization problem leading to a steering sequence where the cost function is minimized.

After having determined the optimal steering scenario, the current cycle is completed by applying the first steering angle $\delta$ from the determined steering scenario to the trailing vehicle. The algorithm also determines respective longitudinal acceleration for each step in the steering scenario. This value, however, is being overwritten by results of the longitudinal clearance controller.

As shown, the following costs parameters may be used:
Cross-track error,
Orientation error,
Difference between leading vehicle speed and trailing vehicle speed,
Longitudinal acceleration
Change of longitudinal acceleration,
Trailing vehicle steering angle, and
Change of trailing vehicle steering angle.

The weights of these cost parameters may be set responsive to the actual speed of the following vehicle. At lower speed, for instance, the cross-track error may be overemphasized while at higher speed, the orientation error may be overemphasized. In certain embodiments depending on the use case, costs can be also weighted differently between waypoints that are close to the current state and waypoint that are further in the future, i.e. close to current position of the leading vehicle.

In still other embodiments, cost parameters regarding longitudinal acceleration, changes of longitudinal acceleration, steering angle, and changes of steering angle may be used in order to smoothen the driving behavior, i.e. acting as dampeners on fast changes of driving instruction actuators.

In still other embodiments, more advanced approaches, as for example reinforcement learning algorithms may be applied in combination with a model predictive controller or as solitary solution.

In certain embodiments, steering angle values may furthermore be subject to additional adjustments, as for example, to set driving parameter values, set or scheduled constraints for driving instructions dependent or independent of the actual driving state, Advanced Driver Assistant System function input, Autonomous Driving System function input, or Advanced Vehicle Safety System function input.

Furthermore, the interaction as described here may be contingent on specific prerequisites and conditions, as for example, a valid digital connection between vehicles.

Figure 10:
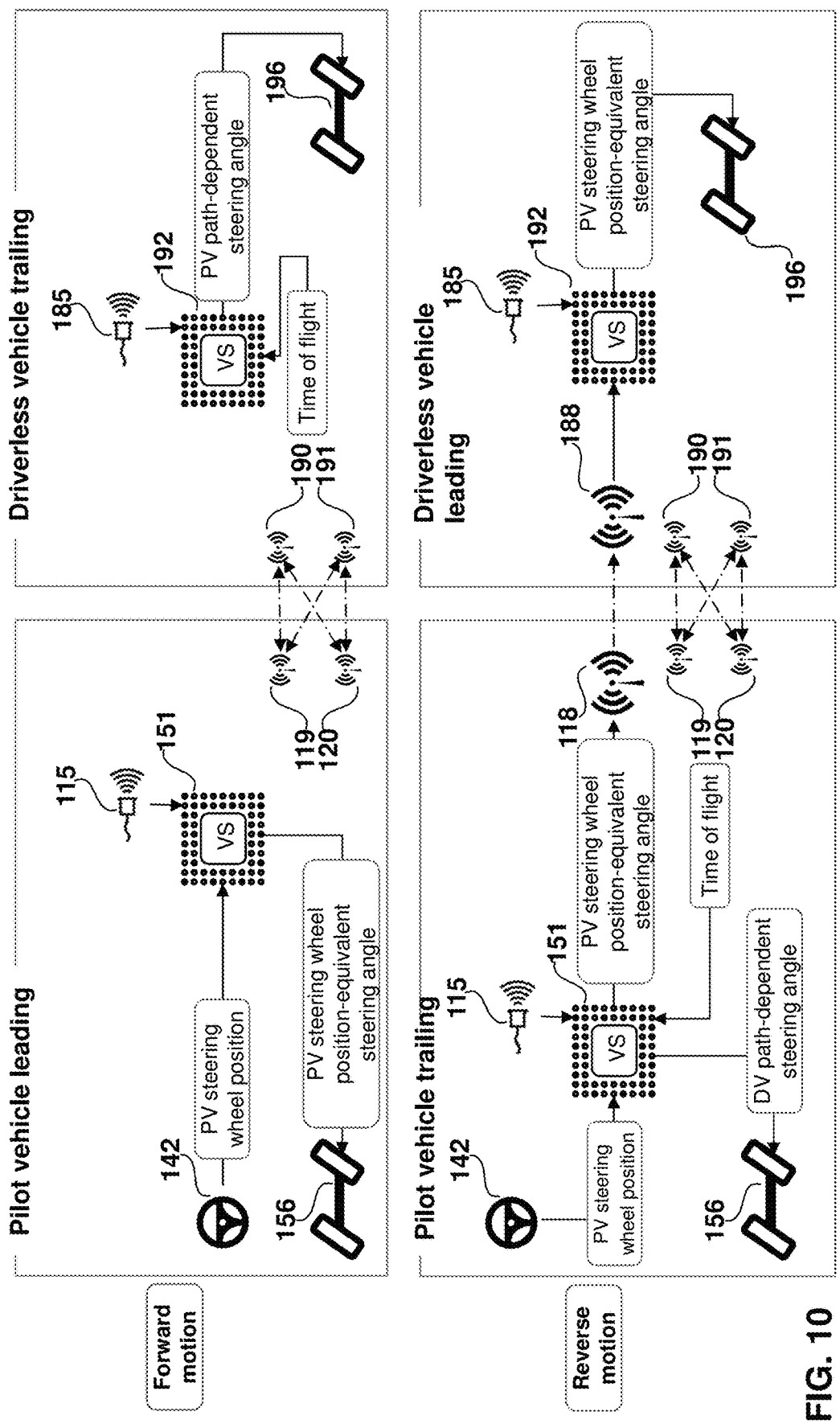
FIG. 10 is a block diagram illustrating an example, non-limiting embodiment of the collaborative drive control-specific interaction between two vehicles in accordance with various aspects described herein.

Referring now to FIG. 10 a block diagram is shown illustrating an example, non-limiting embodiment of the collaborative drive control-specific interaction between two vehicles driving in a convoy, both either in forward or in reverse motion, while periodically determining and executing lateral driving instructions in accordance with various aspects described herein.

In order to follow a continuous vehicle path over time, all or selected steps described here may be repeated in periodic cycles which can be synchronized with longitudinal driving instructions.

In FIG. 10, two upper boxes marked "Pilot vehicle leading" and "Driverless vehicle trailing" depict a possible interaction in a convoy of two vehicles in forward motion with the pilot vehicle as the leading vehicle, and the driverless vehicle as the trailing vehicle.

Lateral control user input in the pilot vehicle may be received from a pilot vehicle steering wheel 142 and transmitted via a wired or wireless connection to the pilot vehicle control unit 151.

In parallel, the pilot vehicle control module 151 may constantly receive data from a plurality of state sensors 115, required for determining lateral driving instructions. Such data may include pilot vehicle's steering angle, speed and longitudinal acceleration.

Next, the pilot vehicle control module 151 may translate the steering wheel position or movement into an appropriate pilot vehicle steering angle value and transmit it to a power steering system 156 for execution. Execution may be performed through the pilot vehicle control module 151 directly or through an electronic control unit associated with the power steering system 156.

The trailing driverless vehicle may determine the relative position of the leading pilot vehicle by measuring time-of-flight differences between time-synchronized messages between pilot vehicle Ultra-Wideband sensors 119, 120, and driverless vehicle Ultra-Wideband sensors 190, 191. Relative positions may also be determined by any other suitable configuration including LIDAR, RADAR, and ultrasound sensors. Together with a time stamp, results representing a specific pilot vehicle waypoint may be stored in a memory as input to a model predictive controller when determining trailing vehicle steering angles.

In parallel, the driverless vehicle control module 192 may constantly receive data from a plurality of state sensors 185, required for determining lateral driving instructions of any of the vehicles involved. Such data may include driverless vehicle's steering angle, speed and longitudinal acceleration.

The driverless vehicle control module 192 may now determine an appropriate pilot vehicle path and associated driverless vehicle steering angle. A controller output in terms of a pilot vehicle path-dependent driverless vehicle steering angle may then be transmitted by the driverless vehicle control module 192 to the driverless vehicle's power steering system 196 for execution. Execution may be performed through the vehicle control module 192 directly or through an electronic control unit associated with the power steering system 196.

The two lower boxes of FIG. 10 marked "Pilot vehicle trailing" and "Driverless vehicle leading" depict a possible interaction of a convoy of two vehicles in reverse motion with the pilot vehicle as the trailing vehicle and the driverless vehicle as the leading vehicle. As before, lateral control user input in the pilot vehicle may be received from pilot vehicle steering wheel 142 and transmitted via a wired or wireless connection to the pilot vehicle control unit 151.

Now, the pilot vehicle control module 151 may determine the steering wheel position-equivalent steering angle and transmit it via the telecommunication receivers and transmitters 118, 188 to the control module 192 of the driverless vehicle, which in this case is the leading vehicle.

In parallel, the driverless vehicle control module 192 may constantly receive data from a plurality of state sensors 185, required for determining lateral driving instructions. Such data may include driverless vehicle's steering angle, speed and longitudinal acceleration.

The driverless vehicle control module 192 may now determine the steering wheel position-equivalent driverless vehicle steering angle. The driverless vehicle control module 192 may transmit the steering angle to the driverless vehicle's power steering system 196. Steering control may be performed through the driverless vehicle control module 192 directly or through an electronic control unit associated with and possibly embedded in the power steering system 196.

At the same time the pilot vehicle, i.e. in this case the trailing vehicle, may receive the relative position of the driverless vehicle by measuring time-of-flight differences between time-synchronized messages between pilot vehicle Ultra-Wideband sensors 119, 120, and driverless vehicle Ultra-Wideband sensors 190, 191. Alternatively, any other suitable sensor configuration including LIDAR, RADAR, and ultrasound sensors may be used. Together with a time stamp, results in terms a specific driverless vehicle waypoint may be stored in memory as input to the model predictive controller when determining trailing vehicle steering angles.

In parallel, the pilot vehicle control module 151 may constantly receive data from a plurality of state sensors 115, required for determining lateral driving instructions of any of the vehicles involved. Such data may include pilot vehicle's steering angle, speed and longitudinal acceleration.

The pilot vehicle may now determine an appropriate driverless vehicle path-dependent steering angle. Controller output in terms of a driverless vehicle path-dependent pilot vehicle steering angle may then be transmitted by the pilot vehicle control module 151 to the pilot vehicle's power steering system 156 for execution. Execution may be performed through the pilot vehicle control module 151 directly or through an electronic control unit associated with or even embedded in the power steering system 156.

In another embodiment, instead of, or parallel to measuring another vehicle's relative position, the host vehicle may receive information on the other vehicle's relative position directly from the other vehicle via vehicle-to-vehicle communication, based on the other vehicle having performed time-of-flight difference measurement or any other valid technique of relative position measurement.

In yet another embodiment, with the pilot vehicle in stationary mode and in control of the driverless vehicle's reverse motion path remotely, the interaction described here may apply only for the part of human driver steering wheel input received and transmitted to the driverless vehicle for direct execution.

In still another embodiment, any of the steering angle values described herein may be subject to additional adjustments, as for example, set driving parameter values, set or scheduled constraints for driving instructions dependent or independent of the actual driving state, Advanced Driver Assistant System function input, Autonomous Driving System function input, or Advanced Vehicle Safety System function input. Furthermore, the interaction as described here may be contingent on specific prerequisites and conditions, as for example, a valid digital connection between vehicles.

In accordance with the vehicle system operating parameters set upon connection, any of the tasks herein and required for determining lateral driving instructions of any of the vehicles involved may be performed by either one or in a distributed architecture even by more than one of the vehicle systems involved.

FIG. 11 is a sequence diagram illustrating an overview of an example, non-limiting embodiment of the collaborative drive control method as described herein. The collaborative drive control method may simulate the effects of a physical connection or coupling between a pilot vehicle and one or more driverless vehicles in a convoy through on-board digital data processing activities and digital vehicle-to-vehicle communication.

The method includes periodic interaction between a host vehicle's vehicle system and another vehicle's vehicle system, leading to coordinated driving instructions that will ensure a coordinated, synchronized change of the path of all vehicles in the convoy. Such interaction between a plurality of vehicle systems may be performed in periodic cycles once a connection between the vehicle systems has been established. Periodic cycles may be executed at a frequency rate of between 1 per second and 100 per second or higher. All steps of a periodic cycle are shown inside dotted line box 395.

In step 300 the pilot vehicle identifies the driverless vehicle and establishes a connection. Upon connection, vehicle systems of any of the vehicles involved may transmit, receive, and store vehicle specific connection and control information. Connection and control information is required to integrate vehicle systems operations and functionality of two or more vehicles by setting certain vehicle system parameters.

Once the connection between all vehicles involved has been established, the convoy's desired path may be determined by a human driver constantly entering at least one of longitudinal and lateral motion requests via pilot vehicle physical controls. Physical controls may function as adaptive sensor-actuator units capable of implementing pre-set driving constraints. For example, a driverless vehicle's maximum steering angle at a given speed may be implemented in a pilot vehicle through a limitation of the rotational steering angle of a steering wheel.

In step 320, the pilot vehicle may adapt such motion requests to a particular set of vehicle system parameter values as agreed upon derived from the driverless vehicle as part of its specific connection and control information. For example, the pilot vehicle steering wheel output may be limited to a driverless vehicle specific maximum rotational steering angle, set to a specific steering gear and instructed to inform the human driver through tactile feedback about approaching steering angle limits.

In step 330 the pilot vehicle generates a desired path request message including at least a longitudinal and a lateral motion request. In order to move from an actual to a desired path, a vehicle must execute instructions related to lateral and longitudinal motions. A desired path request thus may at least contain information of the desired path of the convoy from the pilot vehicle perspective in terms of lateral driving instructions, e.g. a steering angle leading to a path for convoy vehicles to follow, and longitudinal driving instructions, i.e. a desired longitudinal positive or negative acceleration value.

In certain embodiments, the desired path request message may include also a desired convoy drive mode either selected by the human driver via the pilot vehicle system user interface or automatically proposed by the pilot vehicle's vehicle control system. For example, the human driver in the pilot vehicle may request the driverless vehicle's vehicle system to operate in partially autonomous mode whenever trailing the pilot vehicle while turning a close corner in order to avoid collision with obstacles and other physical objects.

Next, in step 332 the controller performing adaptive clearance agile-vehicle control may be invoked in order to determine longitudinal driving instructions. The adaptive clearance agile-vehicle control technique implements a method in which longitudinal driving instructions of the vehicle that is actually capable of relatively higher longitudinal acceleration performance than another vehicle in a convoy are adapted to longitudinal driving constraints caused by the latter vehicle, i.e. the vehicle that is capable of relatively lesser longitudinal acceleration performance in order to achieve a target longitudinal clearance between vehicles.

In parallel to step 332, in step 334 model prediction controlled waypoint following may be invoked in order to determine lateral driving instructions. The model prediction controlled waypoint following technique may determine lateral driving instructions for each vehicle of a plurality of vehicles driving in a convoy under consideration of a convoy's desired path, the actual driving state of a convoy and its individual vehicles, and all relevant actual driving constraints of the convoy and its individual vehicles. The model prediction controlled waypoint following technique implements a method in which lateral driving instructions of any trailing vehicle in a plurality of vehicles driving in a convoy are determined under consideration of actual waypoints created by one or more of the vehicles leading such trailing vehicle in the convoy. A waypoint is understood to describe a record of a vehicle's exact geographical position within a common coordinate system at a specified time in the past at a specified time in the past.

Upon completion of longitudinal and lateral driving instructions determination the validity of vehicle-to-vehicle connection mode may be assessed in step 336. Connection mode may be valid if the convoy vehicles in scope occur at the particular physical positions as scheduled, expected, or predicted by the collaborative drive control method, a minimally viable set of collaborative drive control devices of each of the vehicles is connected as scheduled and functioning as required, and all required vehicle system parameters are set to correct values as agreed upon during initial identification and connection.

In case of a valid connection, the pilot vehicle in step 340 and the driverless vehicle in step 380 may execute driving instructions as determined in steps 332, 334. Driving instruction execution may include executing longitudinal and lateral motion instructions by a vehicle control module of each of the vehicles involved.

In step 350 the pilot vehicle may record and store its own driving state by reading and interpreting vehicle sensor data. In other embodiments, driving state information of other vehicles may also be recorded and stored by the pilot vehicle, such as, for example, in case other vehicles' driving state information is required to adapt pilot vehicle human driver-set instructions in step 320, or as input to pilot vehicle Advanced Driver Assist systems or Advance Vehicle Safety systems.

Driving state information may include data on at least one of vehicle speed, vehicle direction, vehicle orientation, longitudinal acceleration, and lateral acceleration. Driving state data may also contain past, actual, and predicted longitudinal clearance, past, actual, and predicted steering angles, and past, actual, and predicted relative geographical positions of vehicles in the convoy. In certain embodiments, also road conditions including longitudinal inclination, lateral cant, road surface conditions, ambient conditions, and geographic location may be recorded and stored.

Driving state information is primarily used in the next recurrent periodic cycle for determining driving instructions in steps 332 and 334. Stored driving state information may also be used to feedback information to a human driver via a pilot vehicle user interface in step 354 prior to entering a new set of pilot vehicle human driver input in step 356
 to provide input for setting pilot vehicle active physicals controls in step 356, and
 to adapt pilot vehicle human driver-set driving instruction in step 320 to pre-set constraints as agreed upon during initial identification and connection or reconnection.

In certain embodiments, pilot vehicle human driver input of step 356 may be initiated, guided or controlled by passive or active Advanced Driver Assist (ADA) system functions, Advanced Vehicle Safety (AVS) system functions. Thus, stored driving state information may also be used as input for determining instructions from Advanced Driver Assistance systems and/or Advanced Vehicle Safety systems in step 352.

The term "passive Advanced Driver Assist system" is understood to describe a vehicle system component capable of generating and delivering critical driving- and traffic related information to a human driver. Passive Advanced Driver Assist Systems functions may include among others Lane Recognition, Lane Change Assist, Collision Warning, Traffic Sign Detection, or Driver Monitoring, Night View Assist, Intelligent Speed Warning, and Green Light Speed Advisory.

The term "active Advanced Driver Assist system" is understood to describe a vehicle system component capable of initiating and executing driving instructions without human driver input. Such driving instructions may be overridden at any time by a human driver. Active Advanced Driver Assist Systems functions may include among others Active Advanced Driver Assist Systems functions, including Cruise Control, Adaptive Cruise Control, Active Lane Keeping, Lane Change Support/Control, Rear Assist, Intelligent Parking Assist, and Emergency Stop.

The term "Advanced Vehicle Safety system" is understood to describe a vehicle system component capable of initiating and executing driving instructions without human driver input. Such driving instructions may or may not be overridden at any time by a human driver. Advanced Vehicle Safety Systems functions may include among others anti-skid control, electronic stability control, hill descent control, active break assist/autonomous emergency braking, lateral collision avoidance (e.g. passengers, vehicles, fixed/moving obstacles).

In step 390 the driverless vehicle may record and store its own driving state. In certain embodiments, driving state information of other vehicles may also be recorded and stored by a driverless vehicle.

Stored driving state information may be used as input for determining instructions from driverless vehicle Advanced Vehicle Safety systems and Autonomous Driving systems in step 394. Such instructions may be used for example to adjust driving instructions for any of the vehicles involved. Such instructions may also be used to directly overrule driverless vehicle driving instructions from adaptive clearance agile-vehicle control and model prediction controlled waypoint following when a collaborative drive control connection is terminated.

The term "Autonomous Driving system" is understood to describe a vehicle system component capable of fully controlling a vehicle without any oversight or input from a human driver.

Collaborative drive control process steps 320 to 394 may be executed periodically and in recurrent loops as long as the connection is valid. A connection may be terminated in case of
1. a human driver terminating collaborative drive control, for example via a pilot vehicle user interface,
2. any of the vehicle systems involved directly terminating collaborative drive control due to assessing a collaborative drive control connection invalid, among others, for the reasons described above.

Upon termination, collaborative drive controls methods may end, leading to handing over control over driving instructions to a human driver in the pilot vehicle assisted or partially controlled by the pilot vehicle's vehicle control system, and to the vehicle systems of each of the driverless vehicles involved. Upon termination, the pilot vehicle will generate, store an event record including at least an identity of each vehicle involved in the event, a time stamp and the location of the event.

Figure 12:
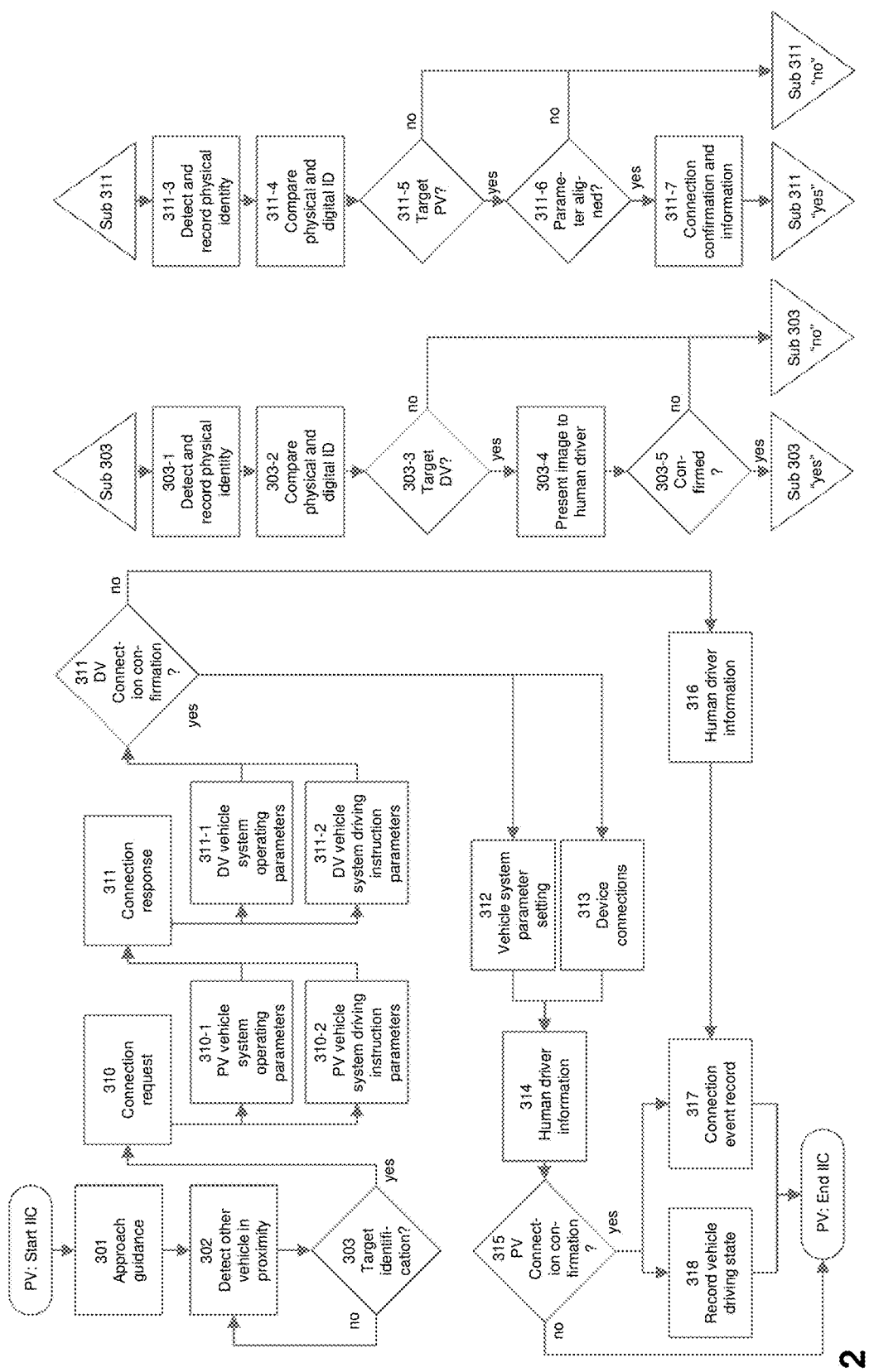
FIG. 12 is a sequence diagram illustrating an example, non-limiting embodiment of the collaborative drive control pilot vehicle-specific initial identification and connection process in accordance with various aspects described herein.

Turning now to FIG. 12, a sequence diagram illustrating an example, non-limiting embodiment of the collaborative drive control pilot vehicle-specific technique for initial identification and connection is shown. Collaborative drive control starts in step 301 with the pilot vehicle and/or driverless vehicle requesting information on the other vehicle's identity and current geographical location. Information on the vehicle identity may contain a unique address for connecting via wireless telecommunication. After establishing communication, the pilot vehicle and the driverless vehicle may agree upon a specific pre-connect approach mode. Based on actual locations and the selected pre-connect approach mode, a human driver and/or a vehicle system may guide the approach of vehicles from distant, non-visible range to near-visible range or even visible range.

Upon entering near-visible range, in step 302 the pilot vehicle may start monitoring its environment for other vehicles via optical devices (cameras) and/or active sensors (Laser/LIDAR, Ultrasound), receiving status messages including a vehicle identity and a vehicle position via receivers (Infrared, Radio) from other vehicles, and periodically transmitting vehicle status messages including a vehicle identity and a vehicle position via transmitters (Infrared, Radio) to other vehicles.

In sub-process 303 pilot vehicle sensors may detect in step 303-1 another vehicle, detect the other vehicle's position through one or more of its sensors, and detect and store the other vehicle's physical identity information. Physical identity information may include license plate information, other forms of encoded or non-encoded optical identity information, and/or information derived from a vehicle's physical appearance. In step 303-2 the pilot vehicle may compare physical identity information with digital identity information and position information in a status message received from the other vehicle by vehicle-to-vehicle communication via the vehicle system's communication interface.

In another embodiment, the pilot vehicle may compare information (e.g. TAN transaction number information) presented ad-hoc by the other vehicle via a digitally controlled optical device (e.g. a digital license plate) to information with digital identity information and a position from a status message received from the other vehicle by vehicle-to-vehicle communication via the vehicle system's communication interface.

Next, in step 303-3 the pilot vehicle may compare the other vehicle's identity with a target driverless vehicle identity stored in vehicle system memory or received from a remote server. In case of a match, the vehicle image may be presented to the pilot vehicle human driver in step 303-4 through the pilot vehicle's vehicle system user interface for confirmation.

Upon confirmation of the match by a human driver through the user interface in step 303-5, the pilot vehicle may in step 310 generate and transmit a connection request to the target vehicle. The connection request 310 may include a set of vehicle system parameters required to align vehicle system operating and driving instruction controls across the vehicles involved, comprising but not limited to pilot vehicle system operating parameters 310-1 and pilot vehicle system driving instruction parameters 310-1. In particular, a pilot vehicle's minimum required set of vehicle operating system functions and system devices as well as a pilot vehicle's minimum required set and commonly available set of driving instruction functions. FIG. 13 presents a list of examples of such vehicle system parameters.

Upon reception of a connection request the driverless vehicle may generate a connection response 311, including required information on driverless vehicle system operating parameters 311-1 and driverless vehicle system driving instruction parameters 311-2.

In a sub-process 311 driverless vehicle sensors may detect in step 311-3 another vehicle, detect and store the other vehicle's position through one or more of its sensors, and detect and store the other vehicle's physical identity information. Physical identity information may include license plate information, other forms of encoded or non-encoded optical identity information, and/or information derived from a vehicle's physical appearance. The driverless vehicle may compare in step 311-4 physical identity information with digital identity information and position information of a status message received from the other vehicle by vehicle-to-vehicle communication via the vehicle system's communication interface.

In another embodiment, the driverless vehicle may compare information (e.g. TAN transaction number information) presented ad-hoc by the other vehicle via a digitally controlled optical device (e.g. a digital license plate) to information with digital identity information and a position from a status message received from the other vehicle by vehicle-to-vehicle communication via the vehicle system's communication interface.

Next, in step 311-5 the driverless vehicle may compare the other vehicle's identity with a target pilot vehicle identity stored in vehicle system memory or received from a remote server. If records do not match, the driverless vehicle may send a decline message as response to pilot vehicle's connection request 310.

In case of a match the driverless vehicle may in step 311-6 compile driverless vehicle connection and control information required by the pilot vehicle to determine common sets vehicle system operating parameters and vehicle system driving instruction parameters.

In step 311-7 the driverless vehicle may generate and transmit a connection confirmation information message as response to the connection request 310. The connection confirmation information message may include the driverless vehicle's compiled set of connection and control information required for the pilot vehicle to set vehicle system parameters in alignment with driverless vehicle system parameters.

In case the driverless vehicle rejects to confirm the connection in step 311, the pilot vehicle's human driver may be informed accordingly in step 316, and the pilot vehicle may generate and store an event record in step 317 containing detailed information about driverless vehicle's response, including the reasons for the rejection.

Upon receiving the driverless vehicle's connection confirmation information, the pilot vehicle may in step 312 determine the common set of vehicle system parameters and the common set of vehicle system driving instruction parameters. Such vehicle system parameter values may be required in particular for adapting pilot vehicle motion requests by the longitudinal clearance controller as well as for determining lateral driving instructions by the model predictive controller.

In parallel, the pilot vehicle may in step 313 store driverless vehicle specific connection and control information and establish all device connections required to perform collaborative drive control functions across the vehicle systems involved. Required device connections may include, but are not limited to connections between 1. Driverless vehicle devices and pilot vehicle's vehicle system, for the purpose of enabling the pre-adaption of desired path information prior to transmission, and presenting sensor data to pilot vehicle user interface (e.g. display of backward facing camera images to a human driver);
2. Pilot vehicle sensors and driverless vehicle's vehicle system, for the purpose of timely and comprehensive information about driving state sensor data; and
3. One driverless vehicle's devices and another driverless vehicle's vehicle system, for the purpose of timely and comprehensive information about driving state sensor data in a convoy with more than a singular driverless vehicle.

With all required vehicle system parameters set and all device connections established, the pilot vehicle's vehicle system may inform the pilot vehicle's human driver via its user interface about the technical completion of the connection, important settings, and relevant consequences for driving the specific convoy in step 314. In order to finalize the initial identification and connection, the human driver must confirm having received, understood, and personally accepted all pre-conditions, requirements, constraints and other relevant facts regarding traffic safety, security, etc. which arise from piloting the specific convoy, and in particular, implications as to human driver responsibilities and accountability thereof. Pertaining to the above matter, the pilot vehicle's human driver may in step 315 finally confirm the specific connection, and thereby instructing the pilot vehicle's vehicle system to proceed accordingly.

Responsive to the human driver as to confirming the connection, the pilot vehicle's vehicle system may in step 317 generate and store an event record related to the connection event. The pilot vehicle may furthermore transmit the connection event record to the driverless vehicle and to a remote server. The connection event record may include pilot vehicle identity information and driverless vehicle identity information, pilot order reference, time stamp of the event, geographical location of the event, detailed records of the agreed upon adjustment schedule regarding a set of Convoy driving instructions, including irregularity handler instructions, and driving constraints.

After generation and storing of the connection event record, the pilot vehicle system may start the first recurrent periodic cycle of collaborative drive control operation in step 318 by sensing relevant vehicle driving states as per vehicle system parameters set.

In case the human driver declines the connection confirmation in step 315, the pilot vehicle's vehicle system may disconnect from all driverless vehicle devices and end collaborative drive control operation.

Now turning to FIG. 13 a table diagram is shown, illustrating an example, non-limiting embodiment of vehicle system parameters to be set during initial identification and connection between a driverless vehicle and a pilot vehicle. Collaborative drive control-related vehicle system parameters are organized in categories "I. Vehicle system operating alignment", and "II. Driving instruction control alignment". Various examples of parameters are listed in column "Examples"

For category I, all vehicles involved may determine a minimum required set of vehicle system functions required to operate safely, securely, and reliably when controlling vehicle components.

Similarly for category II all vehicles involved may determine a minimum required set of driving instructions required to operate a vehicle safely, securely, and reliably, including instructions for handling irregularities, needed for safe and secure driving control from the driverless vehicle's perspective, i.e. considering and reflecting actual and specific characteristics of the particular vehicle. In case, a pilot vehicle is not capable of supporting the driverless vehicle's minimum required set of driving instructions for any reason, a connection must not be established.

Furthermore, autonomous control functionality, advanced driver assist functionality, and advanced vehicle safety system functionality possibly interfering with collaborative drive control functionality in any of the vehicles involved must be adequately adapted or switched off during collaborative drive control. Examples include:

A driverless vehicle autonomous lane keeping functionality must not interfere with lateral convoy driving instructions when switching lanes.

Safety-related driving constraints may have to be adapted by identifying the individual constraints with the strictest constraint value per constraint type and determine a common set of constraints based thereon. For instance, in case the driverless vehicle has set maximum lateral acceleration under dry, windless ambient conditions and regular road surface at a value of 4 m/s$^2$, the pilot vehicle may set a stricter value of 3.5 m/s$^2$ in order to account for additional factor as, for example, human driver experience level, expected device communication delays etc. In this case, pilot vehicle may select and schedule the stricter value of 3.5 m/s$^2$ for application.

Advance vehicle safety system function may have to be selectively integrated with collaborative drive control functionality, i.e. responsive to specific situations. For instance, a collision avoidance and emergency braking function of a trailing vehicle must not cause emergency braking of the leading vehicle via the longitudinal clearance controller if the physical object effecting a potential collision with the railing vehicle is not supposed to cross the leading vehicle's path.

In certain embodiments, steps to align vehicle system parameters may be performed repeatedly in order to detect and solve possible conflicting, inconsistent, or out-of-range parameters to be set within a vehicle system. In such instances variations of parameter values may suffice to find a functioning or equitable solution for all parties involved.

In still other embodiment, parameters required by particular vehicle system functions as, for example wind pressure sensor data required to predict tipping-over boundaries may not be available for processing, due to conceptual or technical incompatibility, defects, or missing devices, etc. In case the affected system functionality is part of the driverless vehicle's minimum required set of driving instructions, a connection cannot be established. In case the affected system functionality is not part of the minimum required set, a connection can be established if agreed-upon by all driving control authorities involved, i.e. pilot vehicle human driver, driverless vehicle vehicle system, and collaborative drive control controllers.

The vehicle system parameter setting embodiment as described herein may establish the precondition to full responsibility and accountability of the human driver and/or the vehicle system in control of the pilot vehicle in all convoy driving situations for safe driving of the convoy in analogy to a physical connection between vehicles, by formally agreeing on all required methods, processes, and values, including an irregularity and emergency handling method, for joint control of pilot vehicle and driverless vehicle, and by storing the agreement in all vehicles systems involved, and if needed on a remote server.

Figure 14:
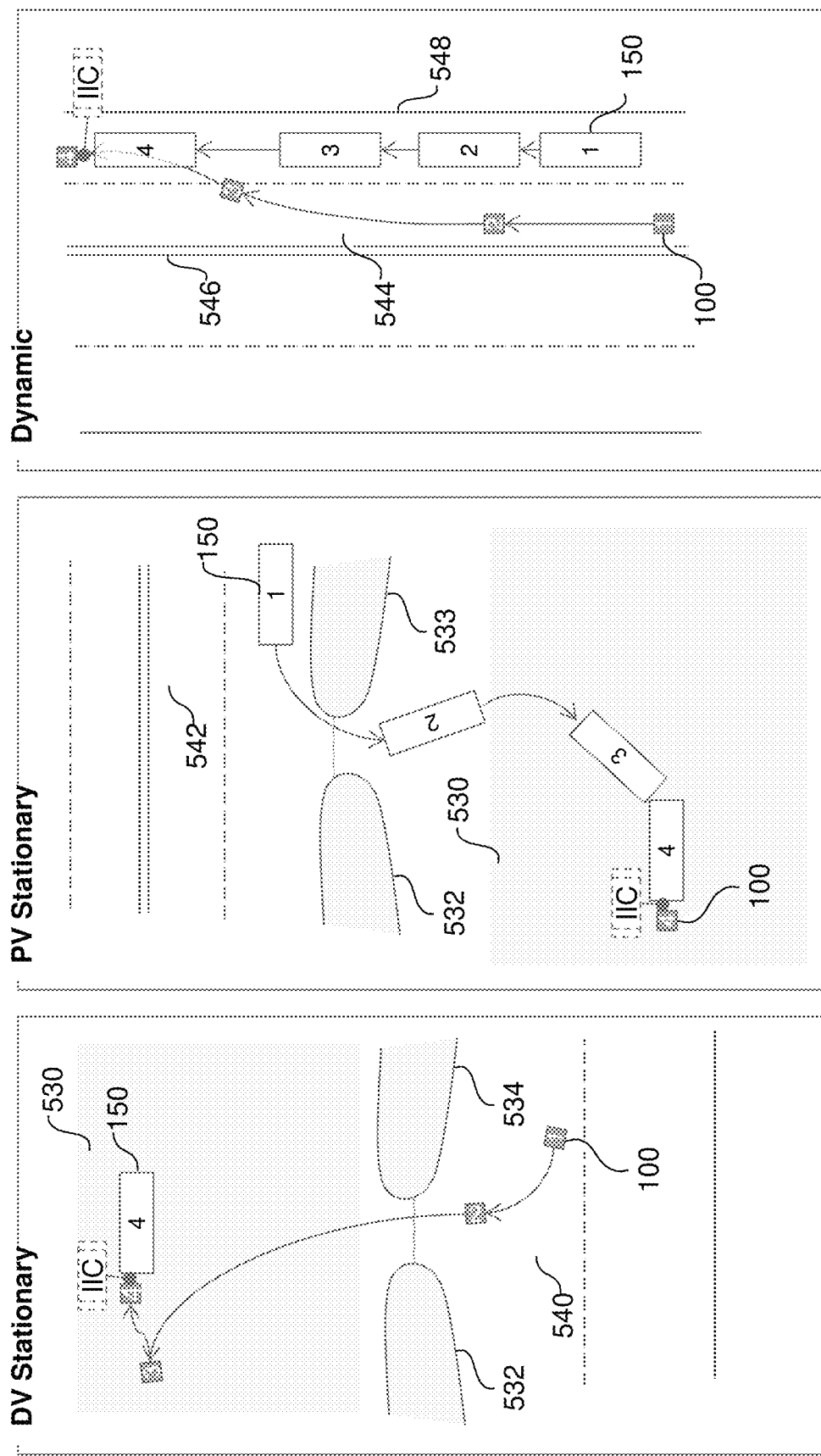
FIG. 14 is a schematic diagram illustrating example, non-limiting stages of pre-connect approach variants in accordance with various aspects described herein.

Now turning to FIG. 14, example, non-limiting embodiments of typical vehicle motions in subsequent stages while both vehicles are approaching each other prior to connect are shown. Depicted stages are marked by numbers according to the respective time sequence.

In a certain embodiment the driverless vehicle in stationary mode (DV Stationary), the pilot vehicle 100 may be in motion on a right-hand-side traffic, single lane road 540 approaching the stationary driverless vehicle 150. In Stage 1, the pilot vehicle 100 may approach a parking lot marked by gray area 530 demarked from through-flow traffic by street shoulders 532, 534. Upon locating the driverless vehicle 150 in the parking lot, the pilot vehicle 100 may turn right in Stage 2 to enter the parking lot. In Stage 3, the pilot vehicle 100 may drive to a position immediately in front of the driverless vehicle 150, and in Stage 4 pull backwards to narrow a clearance in order to enable completion of initial identification and connection.

In this embodiment, pilot vehicle driving instructions for longitudinal and lateral motions of the approach may be performed either entirely by a human driver, by a vehicle system in partially autonomous mode as specified in SAE levels 1, 2, 3 or 4, or in full autonomous mode as specified in SAE level 5.

In another embodiment with the pilot vehicle in stationary mode (PV Stationary), the driverless vehicle 150 may be in motion on a left-hand-side traffic, two-by-to lane highway 542, approaching the stationary pilot vehicle 100. In Stage 1, the driverless vehicle 150 may approach a parking lot marked by gray area 530 demarked from through-flow traffic by street shoulders 532, 534. Upon locating the pilot vehicle 100 in the parking lot, the driverless vehicle 150 may turn left in Stage 2 to enter the parking lot. In Stage 3 the driverless vehicle 150 may approach the rear side of the pilot vehicle 100 and drive in Stage 4 to a position immediately behind the pilot vehicle 100 to narrow a clearance in order to enable completion of initial identification and connection.

In this embodiment, driverless vehicle driving instructions for longitudinal and lateral motions of the approach may be performed either by a vehicle system in partially autonomous mode as specified in SAE levels 4, i.e. sufficient for driverless control on roads of class 540. Driverless vehicle driving instructions may also be performed by a vehicle system in partially autonomous mode as specified in SAE level 3 or 4 while being supervised by a human driver in a remote location, e.g. in pilot vehicle 100 via pre-connect phase partial connection of physical controls and/or user interface or in any other location capable of connecting to and supervising driverless vehicle 150. In various embodiments with respect to technical feasibility, also a vehicle system operating at SAE level 5 "fully autonomous mode" may be possible. However, a vehicle system capable of SAE level 5 per definition does not require piloting, support, or supervision from another authority.

In still another embodiment with both vehicles in motion (Dynamic), the pilot vehicle 100 and the driverless vehicle 150 may travel in parallel motion on a right-hand-side traffic, two-by-to lane highway 544, demarked from opposite traffic by lane guide 546. The pilot vehicle 100 may travel in the left lane at higher speed than driverless vehicle 150 in the right lane. Upon locating the driverless vehicle 150 in Stage 1, the pilot vehicle 100 may approach the driverless vehicle 150. In Stage 2 the pilot vehicle 100 surpasses the driverless vehicle 150. In Stage 3 the pilot vehicle 100 has surpassed the driverless vehicle 150 and switches over to the right lane immediately in front of the driverless vehicle 150. In Stage 4 the pilot vehicle 100 decelerates in order to narrow a clearance to the driverless vehicle 150 at deceleration rates sufficient to complete initial identification and connection while in motion.

In this embodiment, pilot vehicle driving instructions for longitudinal and lateral motions of the approach may be performed either entirely by a human driver, by a vehicle system in partially autonomous mode as specified in SAE levels 1, 2, 3 or 4, or in full autonomous mode as specified in SAE level 5. Driverless vehicle driving instructions for longitudinal and lateral motions of the approach may be performed by a vehicle system in partially autonomous mode as specified in SAE levels 4, i.e. sufficient for fully driverless control on roads of class 540. In various embodiments with respect to technical feasibility, also a driverless vehicle's vehicle system operating at SAE level 5 "fully autonomous mode" may be possible. However, a vehicle system capable of SAE level 5 per definition does not require piloting, support, or supervision from another authority.

Figure 15:
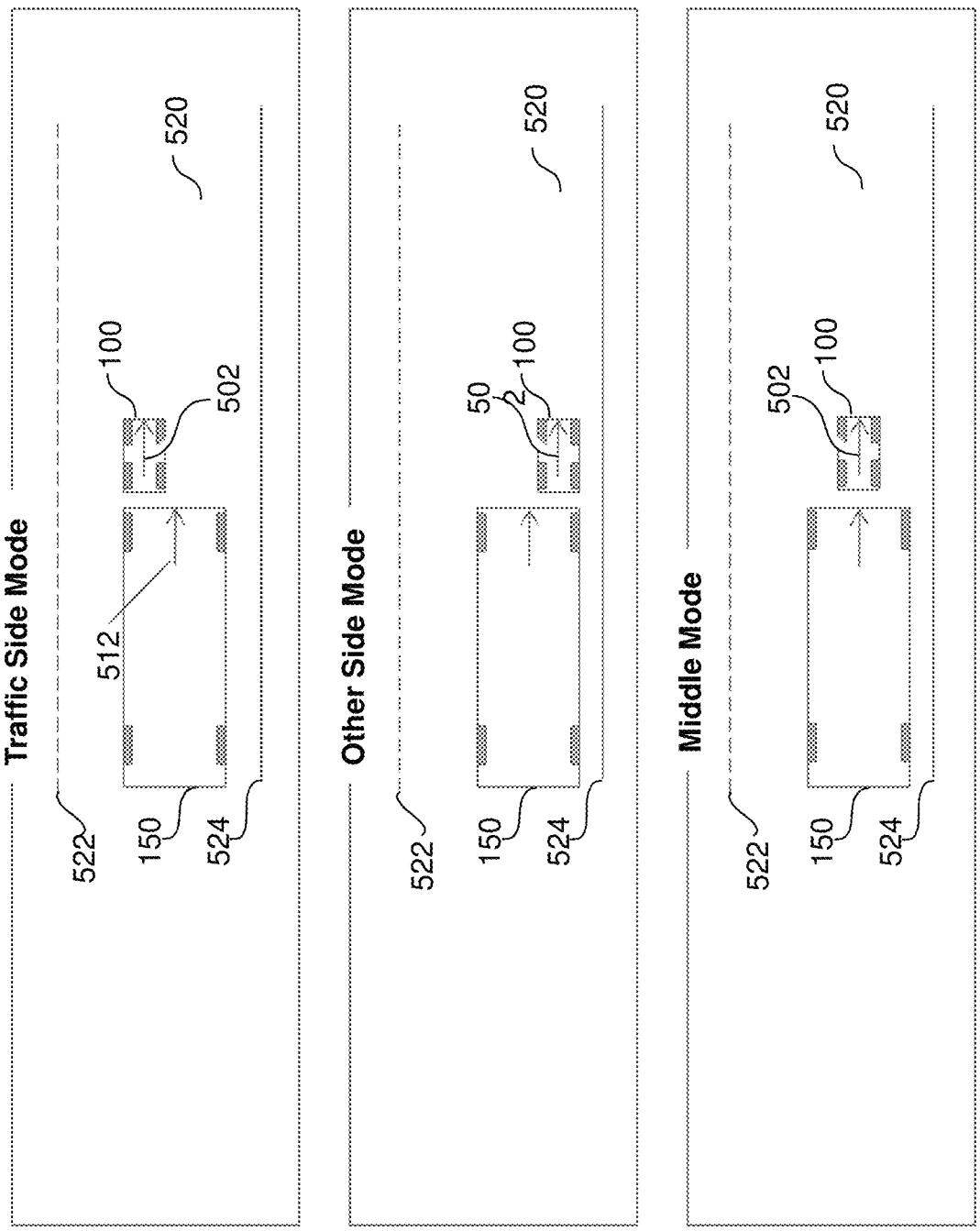
FIG. 15 is a schematic diagram illustrating example, non-limiting embodiments of lane side-related convoy drive modes in accordance with various aspects described herein.

Now turning to FIG. 15, example, non-limiting embodiments of possible convoy drive modes while connected are shown in form of schematic diagrams depicting mode-specific pilot vehicle lane positions. The term "Lane Position" is understood to describe a leading pilot vehicle's primary lateral orientation within a traffic lane relative to a trailing driverless vehicle.

In the illustrated scenario the pilot vehicle 100 and the driverless vehicle 150 travel in right-hand-side traffic in the same lane 520 which is demarked by left and right lane markings 522, 524. In right-hand-side traffic, right lane marking demarks flowing traffic from stationary traffic, pedestrian traffic etc., whereas left lane marking demarks flowing traffic from opposite flowing traffic.

While in a Traffic Side Mode, the pilot vehicle 100 may maintain a lane position aligned with the driverless vehicle 150 to the left in right-hand-side traffic, i.e. on the side facing opposite flowing traffic.

While in an Other Side Mode, the pilot vehicle 100 may maintain a lane position aligned with the driverless vehicle 150 to the right in right-hand-side traffic, i.e. on the side facing opposite flowing traffic.

While in a Middle Mode, the pilot vehicle 100 may maintain a lane position with its longitudinal center axis aligned with longitudinal center axis of the driverless vehicle 150.

Pilot vehicle lane position modes may be combined with all other possible convoy drive modes with at least two vehicles in motion in the same direction and in the same lane.

Preconditions to the activation of pilot vehicle lane position modes in collaborative drive control may exist. Such preconditions may include the following:
1. Adequate parameter setting in the initial identification and connection process, i.e. inclusion of pilot vehicle lane position control in common set of driving instructions; and
2. Traffic rule compliance. Traffic rule compliance may be ensured either by a human driver without or with support from an advanced driver assistance system.

Figure 16:
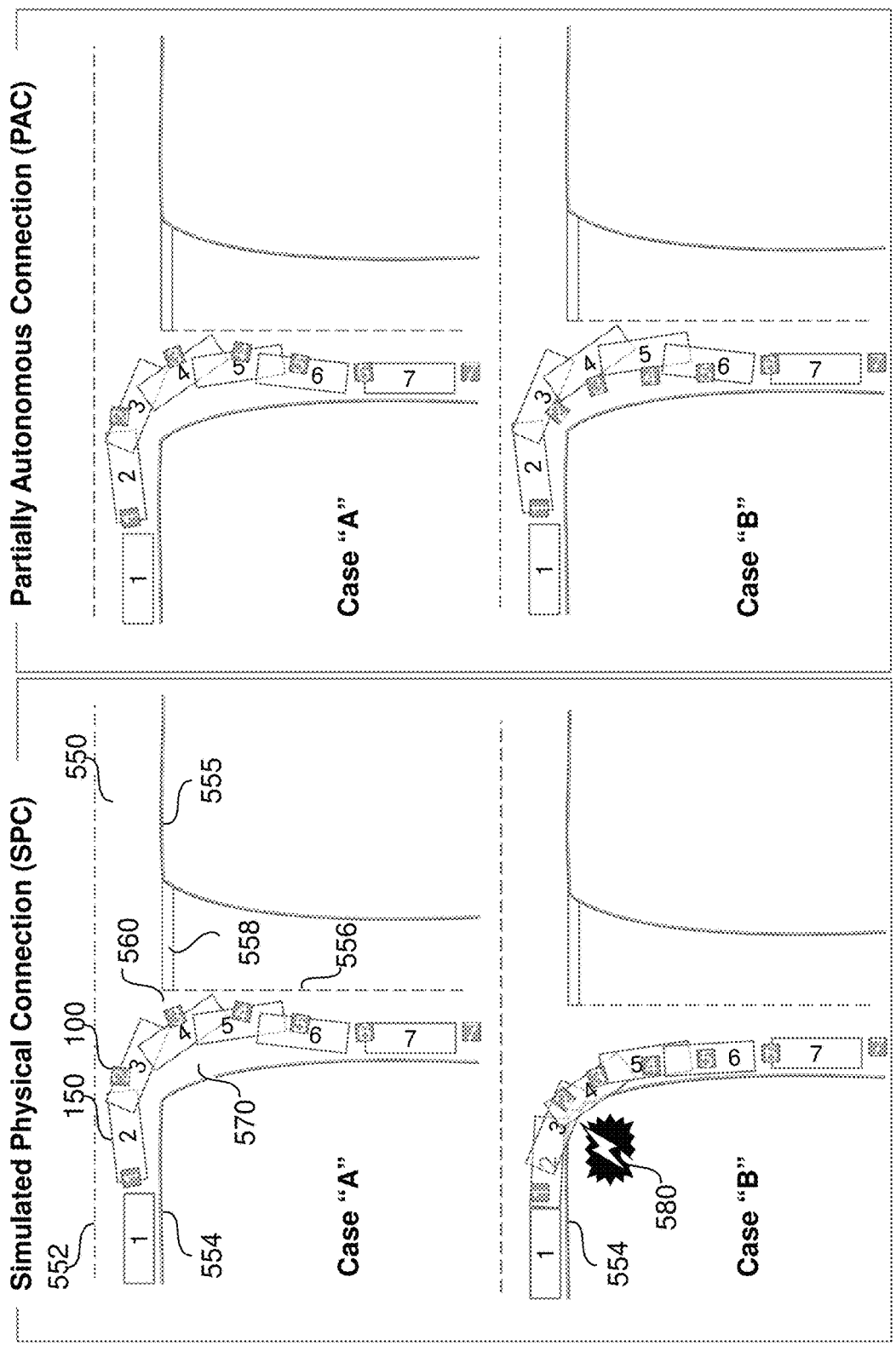
FIG. 16 is a schematic diagram illustrating example, non-limiting embodiments of driverless vehicle control for various convoy drive modes in accordance with various aspects described herein.

Now turning to FIG. 16, example, non-limiting embodiments of driverless vehicle control for various convoy drive modes is shown. A driverless vehicle 150, depicted by a light rectangular box, and a pilot vehicle 100, depicted by a grey square, are shown. Both vehicle symbols are shown with numbers 1 to 7 referring to 7 sequential stages along the curve path depicted. Both vehicles are shown traveling in forward motion on single lane road 550 in right-hand-side traffic near a road junction 560. A broken line 552 demarks the traffic lane from opposite flowing traffic. A second broken line 556 demarks the traffic lane of a joining road 570 from opposite flowing traffic. Solid lines 554, 555 mark hard shoulders, curbs etc. demarking both roads from stationary traffic, pedestrian traffic etc.

Vehicles are depicted comparatively in two specific convoy drive modes, i.e. in simulated physical connection (SPC) and partially autonomous connection (PAC), and two case variants "A" and "B" per convoy drive mode.

Case variant "A" renders very similar paths for both vehicles independent of the selected convoy drive mode, since the pilot vehicle behaves in both cases as if physically connected to the driverless vehicle. In Stage 1 both vehicles approach the junction 560 intending to turn right onto the joining road 570. In order to ensure sufficient clearance from the hard shoulder 554 on turning right, the pilot vehicle 100 lunges out left first in Stages 2, 3 and 4 as would be required in case of a physical connection to the driverless vehicle 150. In Stages 5, 6 and 7 both vehicles pull back to left in nearly identical paths.

Case variant "B" renders significantly different results depending on the selected convoy drive mode although the pilot vehicle steers identical paths in both convoy drive modes. In simulated physical connection mode (SPC) the driverless vehicle 150 will follow closely on the pilot vehicle 100 path, leading to potentially unwanted contact with road markings, hard shoulders, etc. as marked by a flash 580. In partially autonomous connection modes (PAC), the driverless vehicle may divert from the pilot vehicle's path for a defined short stretch by automatically invoking driverless vehicle's vehicle system autonomous driving functionality as per agreed upon common set of driving instructions. Any contact with hard shoulders etc. may be avoided this way.

Figure 17:
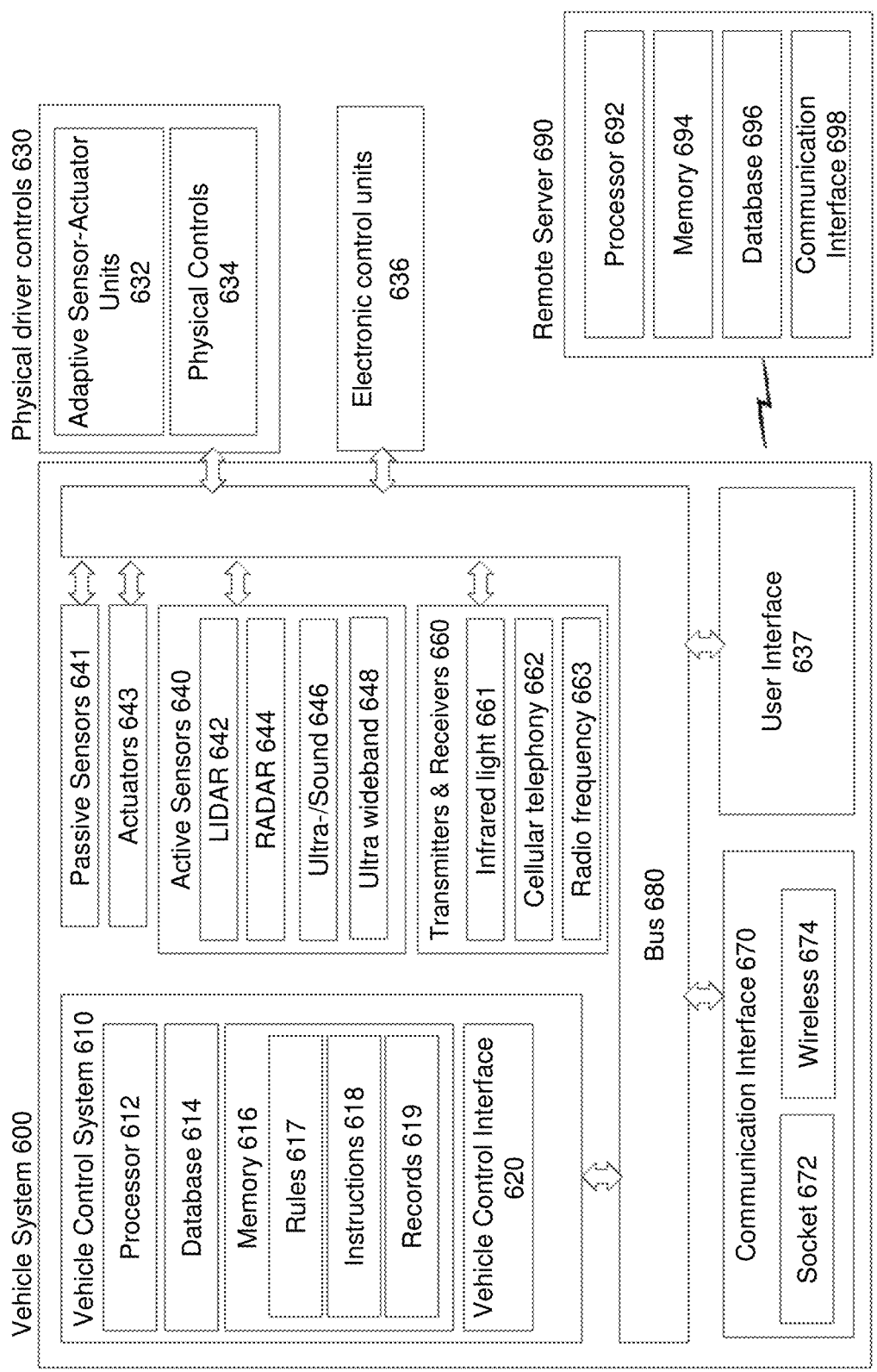
FIG. 17 is a block diagram illustrating an example, non-limiting embodiment of a vehicle system in accordance with various aspects described herein.

Referring now to FIG. 17, a block diagram is shown illustrating an example, non-limiting embodiment of a vehicle system in accordance with various aspects described herein. In particular, a vehicle system 600 is shown for use in conjunction with a host vehicle, such as a pilot vehicle 100 or a driverless vehicle 150. The pilot vehicle 100 and the driverless vehicle 150 may be a connected car, a delivery vehicle, fleet vehicle, service vehicle, freight transportation vehicle or other vehicle.

In particular, the vehicle system 600 includes a processor 612, a database 614, a memory 616, and a communication interface 670 for providing wireless access through a wireless interface 674 and wired access through a socket 672. Wireless access may include communication with a remote server 690 provided via a communications network, for example a cellular telephone network. Wireless access may also include ad-hoc wireless communication with other vehicles through, for example, dedicated short range communication (DSRC). In particular, the communication interface can include a wireless transceiver that operates via 3G, 4G, 5G or higher cellular communications, an 802.11 standard such as 802.11n, 802.11ac, 802.11ad or other wireless local area network protocol, a Bluetooth, ZigBee or other personal area network communications access terminal.

The processor 612 may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The memory 616 can be a single memory device, a plurality of memory devices, and/or embedded circuitry of the processor 612. Such a memory device may be a read-only memory, random access memory, volatile memory, non-volatile memory, static memory, dynamic memory, flash memory, cache memory, and/or any device that stores digital information. Note that if the processor 612 includes more than one processing device, the processing devices may be centrally located (e.g., directly coupled together via a wired and/or wireless bus structure) or may be located in a distributed form (e.g., cloud computing via indirect coupling via a local area network and/or a wide area network). Further note that if the processor 612 implements one or more of its functions via a state machine, analog circuitry, digital circuitry, and/or logic circuitry, the memory 616 storing the corresponding operational instructions may be embedded within, or external to, the circuitry comprising the state machine, analog circuitry, digital circuitry, and/or logic circuitry. Still further note that, the memory 616 may store, and the processor 612 may execute, hard coded and/or operational instructions corresponding to at least some of the steps and/or functions described herein. The memory 616 can be included in an article of manufacture. While a particular bus architecture is shown that includes a single bus 680, other architectures that include multiple buses and/or direct connectivity between one or more elements can likewise be employed. Further, the vehicle system 600 can include additional elements that are not expressly shown. In addition, while shown as a single homogeneous system of components, these components may be embedded in the vehicle at the time of sale, included in an aftermarket device that is installed in the vehicle, included in a user device that can be transported by the vehicle or any combination thereof.

The vehicle system 600 may comprise passive vehicle sensors 641 such as a global navigation satellite system (GNSS) receiver, state sensors including accelerometers, speed sensors, rpm sensors, torque sensors, pressure sensors, still- and video cameras, pressure sensors, and temperature sensors. Furthermore the vehicle system can include active vehicle sensors 640 such as a vehicle LIDAR system, a RADAR system, an RF based location system, an ultrasonic ranging system, Ultra-Wideband systems, and/or one or more other sensors that can detect information about the position, speed and direction of the host vehicle and/or other vehicles and indicated and/or potential changes to position of other vehicles within a certain radius and/or distance in a particular direction. The vehicle system 600 further can include one or more camera sensors coupled to a computer vision system to detect drivable surfaces (free space), lane markings, road signs, license plates, or physical occurrences of other vehicles. The vehicle sensors may include sensors to predict future actions of other vehicles, e.g. by recognizing brake lights, blinker lights, and so forth. The vehicle sensors may further include a navigation system and map data of the environment. The use of map data in combination with a GNSS allows the vehicle system 600 to sense information about its environment that is beyond the range of on-board sensors which may be limited to a line of sight.

The vehicle system 600 may also include actuators 643 such as hydraulic, electric, pneumatic, thermal, magnetic, twisted and coiled polymer, super-coiled polymer or other actuators to move and control mechanisms or system related to capturing human driver physical input and executing driving instructions.

In certain embodiments, the vehicle system 600 can also include a vehicle control interface 620 operatively connected to the processor and capable of controlling a lateral and longitudinal motion of the host vehicle. In an automated vehicle operating in a (partially) autonomous mode, in a vehicle equipped with advanced driver assistance systems such as adaptive cruise control, or in a vehicle equipped with advanced vehicle safety systems such as electronic stability control the processor 612 may influence a longitudinal and/or lateral motion of the vehicle directly through such a vehicle control interface 620.

Vehicle system 600 may furthermore include a user interface 637 which is used to inform a human driver about actions required or information critical to safe and secure driving. In other embodiments, visual information such as rear mirror video streams, sensor readings, etc. may be presented to the human driver of a pilot vehicle through the user interface 637. The user interface device 637 may thus be, for example, a LED screen, a screen display, a head-up display, a laser beam projection or any other type of display used as user interface in automotive vehicles, a speaker, or any similar audio-visual device. The user interface 637 may also receive input from the human driver. For example, the user interface 637 may include keys or buttons, a touchscreen, a speech recognition system, or a gesture recognition system.

The vehicle system 600 may be operatively connected to physical driver controls 630. Physical driver controls 630 can include adaptive sensor-actuator units which may be configured to capture human driver input and at the same time send feedback to the driver about parameters relevant to such driver input. For example, a steering wheel can be equipped with an actuator configured to vary the steering force required from the human driver depending on pre-set parameters and/or actual lateral acceleration data captured by accelerometer sensors. Driver controls 630 can also include physical controls such as mechanical levers or electrical switches.

The vehicle system 600 may be operatively connected to one or more electronic control units 636. Electronic control unit 636 may be embedded in specific vehicle components used to execute driving instructions, including propulsion units, engines, motors, steering units, brake units, and transmission units.

In various embodiments, the processor 612 is used to continuously monitor data received from the vehicle sensors for the presence of another vehicle within the host vehicle's proximity, or to determine the driving state of a vehicle, including but not limited to a vehicle's speed, longitudinal acceleration, and later acceleration. The processor 612 is further used to identify the other vehicle, i.e. to associate an identifier with the other vehicle. The identifier may e.g. be a license plate number or a vehicle's physical occurrence recognized by a computer vision system or source information encoded within a beacon message or received through car-to-car/vehicle-to-vehicle communication using the communication interface 670.

In still other embodiments the processor 612 is used to continuously monitor data received from the vehicle sensors to detect drivable surfaces, lane marking, road shoulders, traffic signs, traffic lights, other vehicles, other traffic participants like pedestrians or bicycles, traffic obstacles, road conditions or ambient conditions. The processors 612 may be configured to use such vehicle sensor data when performing

- passive advanced driver assistance functions as, for example, lane recognition or collision warning,
- active advanced driver assistance functions as, for example, adaptive cruise control or active lane keeping,
- active vehicle safety control functions as, for example, electronic stability control or autonomous emergency baking, and
- autonomous driving control functions according to SAE J3016 levels 1 to 5.

In yet other embodiments, the processor 612 is used to receive data from another vehicle's sensors and receivers via wireless or wired car-to-car communication. Analysis of the data received from the vehicle sensors is performed in accordance with rules 617 stored in memory 616.

The rules serve to detect other vehicles in the host vehicle's proximity, determine the identity of the other vehicle, compare the other vehicle's identity to a target vehicle's identity, transmit messages and data to the other vehicle, and receive messages and data from the other vehicle. A target vehicle is understood to describe a vehicle the host vehicle intends to connect to.

When a target vehicle is discovered, an information exchange for a connection as a convoy can take place automatically between the vehicle system 600 of the host vehicle and the other vehicle. Subject of an information exchange for connection as a convoy is an agreement upon a common set of driving instructions and driving constraints. Manifestation of a potential connection event can occur in various situations, for example with one or more vehicles stationary or with all vehicles on routes with single lanes or multiple lanes for one direction, at crossings, at intersections, or combinations thereof or any other setup.

Furthermore, the rules serve to establish and maintain an ongoing communication with the other vehicle's vehicle system through communication interface 670. In particular, the rules serve to establish and maintain a periodic, high-frequency, uninterrupted exchange of driving instruction-related information between the host vehicle and the other vehicle such as longitudinal and lateral motion instructions to be executed by the vehicle control interface 620.

In various embodiments, when a target vehicle is detected and the common sets of driving instructions and driving constraints between the host vehicle and the other vehicle has been successfully agreed upon each of the vehicles will modify its mode of operation from either (partially) autonomous or human driver controlled to a mode of collaborative drive control together with the other vehicle, in such a way that the vehicle equipped with a human driver will operate as a pilot vehicle, and the other vehicle(s) will operate as driverless vehicle(s). Processor 612 may perform storing the agreed upon sets of convoy driving instructions and driving constraints in memory 616 as supplementary or complementary rules 617 and may applied such rules to generate instructions 618. Data received from vehicle sensors and receivers will be stored by processor 612 in records 619. Event records, as for example a record of a connection event will be generated by processor 612 and stored in persistent form in database 614.

Furthermore, the rules serve to measure the other vehicles' clearance to the host vehicle and the vehicles' relative geographical position in terms of the angle of the other vehicle's longitudinal axis to the host vehicle's longitudinal axis and measure the direction and speed of the other vehicle. The rules still furthermore serve to identify, store, and retrieve individual waypoints of other vehicles in the vehicle's proximity. A waypoint is understood to describe a record of a vehicle's exact geographical position within a common coordinate system at a specified time in the past.

In the pilot vehicle, a user interface device 637 may be used to inform a human driver as to what driving instructions and driving constraints will apply while connected in collaborative drive control mode. The user interface device 637 may further be used to capture input from the human driver when communicating with a vehicle system or a remote server.

In certain embodiments, processor 612 in a pilot vehicle may upon connection generate and transmit an interrupt request message to a driverless vehicle's vehicle system and vice versa. Such an interrupt request message may request from processor 612 in the other vehicle's vehicle system to operate in collaborative drive control mode. In order to be valid, an interrupt request message may be required to contain driving instructions related information.

In other embodiments, such driving instructions may be generated by human driver input. In another example, a mix of driving instruction-related input from a human driver and from a vehicle control system 610 is possible, e.g. in the presence of an advanced driver assist system or an advanced vehicle safety system. In a pilot vehicle processor 612 may apply rules 617 in conjunction with records 619 stored in memory 616 to automatically give synchronous feedback to human driver input, adapt driving instructions to stored driving constraints, and transmit pilot vehicle desired path driving instructions with an interrupt request message through communication interface 670 to a driverless vehicle.

In certain embodiments, the processor 612 may execute instructions 618 stored in the memory 616 to assess the validity of a collaborative drive control connection, for example in a driverless vehicle by recognizing a valid geographical position of a pilot vehicle relative to a driverless vehicle. In that case, processor 612 may apply rules 617 in conjunction with records 619 stored in memory 616 to automatically calculate driving instructions or adapt or adjust driving instructions received from a pilot vehicle, release driverless vehicle driving instructions and pilot vehicle driving instruction to execution, and transmit pilot vehicle driving instructions via vehicle-to-vehicle communication facilitated by communication interface 670 to a pilot vehicle.

In particular, processor 612 may execute instructions 618 stored in the memory 616 to calculate driving instructions or adapt or adjust pilot vehicle longitudinal control user input by rules 617, representing longitudinal clearance controller functionality as explained in FIG. 6 and FIG. 7. Note that in certain embodiments corresponding to specific collaborative drive control use cases it may be assumed that the pilot vehicle is more often categorized as the vehicle that at a given time is actually capable of relatively higher longitudinal acceleration performance. In such use cases, the driverless vehicle's vehicle system may be the appropriate system to perform the instructions implementing the method, since according to the interaction as explained in FIG. 8 such architecture is appropriate to reduce vehicle-to-vehicle communication effort. In other embodiments corresponding to other collaborative drive control use cases, the instructions may be performed by the pilot vehicle's vehicle system. In still other embodiments, the instructions may be performed systematically or coincidentally, periodically or non-periodically alternating between the pilot vehicle's vehicle system and the driverless vehicle's vehicle system contingent to specified conditions, as for example, system availability or system performance.

Furthermore, processor 612 may execute instructions 618 stored in the memory 616 to calculate lateral driving instructions or adapt or adjust pilot vehicle lateral control user input by rules 617, representing model predictive controller functionality as explained in FIG. 9. Note that in certain embodiments corresponding to specific collaborative drive control use cases it may be assumed that the pilot vehicle is more often categorized as the leading vehicle. In such use cases, the pilot vehicle's vehicle system may be the appropriate system to perform the instructions implementing the model predictive controller, since according to the interaction as explained in FIG. 10 such architecture is appropriate to reduce vehicle-to-vehicle communication effort. In other embodiments corresponding to other collaborative drive control use cases, the instructions may be performed by the driverless vehicle's vehicle system. In still other embodiments, the instructions may be performed systematically or coincidentally, periodically or non-periodically alternating between the pilot vehicle's vehicle system and the driverless vehicle's vehicle system contingent to specified conditions, as for example, system availability or system performance.

Driving instructions released for execution in a driverless vehicle may be used by processor 612 to influence longitudinal and lateral motion of the vehicle directly through a vehicle control interface 620. Controlling the vehicle directly can take the form of transferring commands to a control unit capable of autonomously driving the driverless vehicle through the vehicle control interface 620.

Driving instructions released for execution to a pilot vehicle may be used by processor 612, after assessing the validity of a collaborative drive control connection, to influence longitudinal and lateral motion of the vehicle directly through a vehicle control interface 620. Controlling the vehicle directly can take the form of transferring commands to a control unit capable of autonomously driving the pilot vehicle through the vehicle control interface 620.

In certain embodiments, the processor 612 may execute functions to predict a vehicle's future position after the vehicle will have executed specific driving instructions. Such predictions may include predicting the impact of particular driving instructions on the path of a vehicle, and constructing an expected time series of gradual position changes by combining stored recent positions with expected impact of actual driving instructions.

In certain embodiments, such predicting functions may be individually or jointly supported or performed through specific controller devices as, for example Model Predictive Control controllers or Proportional Integral Derivative controllers.

In still another embodiment, the processor 612 may be configured to assess instructions generated from active vehicle safety system functions for a possible violation of agreed upon driving constraints such as, for example, a pilot vehicle deceleration instruction caused by autonomous emergency braking at a rate significantly above the agreed upon maximum pilot vehicle deceleration rate. In that case, the processor 612 may be instructed to invoke an irregularity handler function which is capable of selecting appropriate action of safety risk mitigation and damage control in full accordance with the principle of human driver responsibility, or any other responsibility principle to be applied. In specific embodiments of irregularity handler functionality, the processor 612 may use data from vehicle sensors to assess the potential to recover from an irregularity event and, depending on such potential, re-connect vehicle systems of pilot vehicle and driverless vehicle in collaborative drive control mode at recovery under the terms agreed upon earlier.

In yet another embodiment, the processor 612 may be configured to automatically select an appropriate vehicle- or convoy drive mode dependent on a vehicle's and/or a convoy's driving state as captured by vehicle sensors and receivers. Such a drive mode selection may lead to an automatic application of certain pilot vehicle- or convoy driving constraints. For example, a pilot vehicle of a convoy set to convoy drive mode simulated physical connection in forward motion and starting to reverse with a driverless vehicle leading may cause the processor to switch to convoy drive mode simulated physical connection in reverse motion. Through such a drive mode selection the processor 612 may, for example, automatically limit possible driving instructions regarding longitudinal clearance to narrow values of below 100 cm and lateral convoy angle, describing the angle of the longitudinal axis of the pilot vehicle to the longitudinal axis of the driverless vehicle, to values from 270° to 90°.

Furthermore, processor 612 in a pilot vehicle may automatically terminate collaborative drive control mode in case a connection is assessed invalid. Such an assessment can be reached, for example in case of a driverless vehicle failing to respond to a pilot vehicle interrupt request within due time, failing device connections detected through lacking execution of device-related instructions 618, or invalid vehicle system parameters applied in rules 617. In another example, collaborative drive control can also be terminated by a human driver selecting a termination option which has been presented by processor 612 via user interface 637. In the case of termination, a respective connection termination event record 619 is created and stored locally in the memory 616, in database 614, and/or communicated via communication interfaces 670 and 698 to a remote server 690. The connection termination event record 619 may be stored remotely in a database 696. Such connection termination event records can include pilot vehicle identity, driverless vehicle(s) identity, a date, time and/or place of the event, and a reference to all service event records associated to the convoy between the respective connection event and connection termination event.

The terms "first," "second," "third," and so forth, as used in the claims, unless otherwise clear by context, is for clarity only and doesn't otherwise indicate or imply any order in time or any priority. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. The embodiments (e.g., in connection with the detection of objects using data derived from vehicle sensors) can employ various AI-based schemes for carrying out various embodiments thereof. Moreover, a classifier can be employed to determine a ranking or priority of detected objects. A classifier is a function that maps an input attribute vector, $x=(x1, x2, x3, x4, \ldots, xn)$, to a confidence that the input belongs to a class, that is, $f(x)=$confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired objects will be most impeding to the host vehicle and/or which of the acquired objects will be least impeding to the host vehicle, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, the terms "user," "driver," "customer," "operator" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

Figure 18:
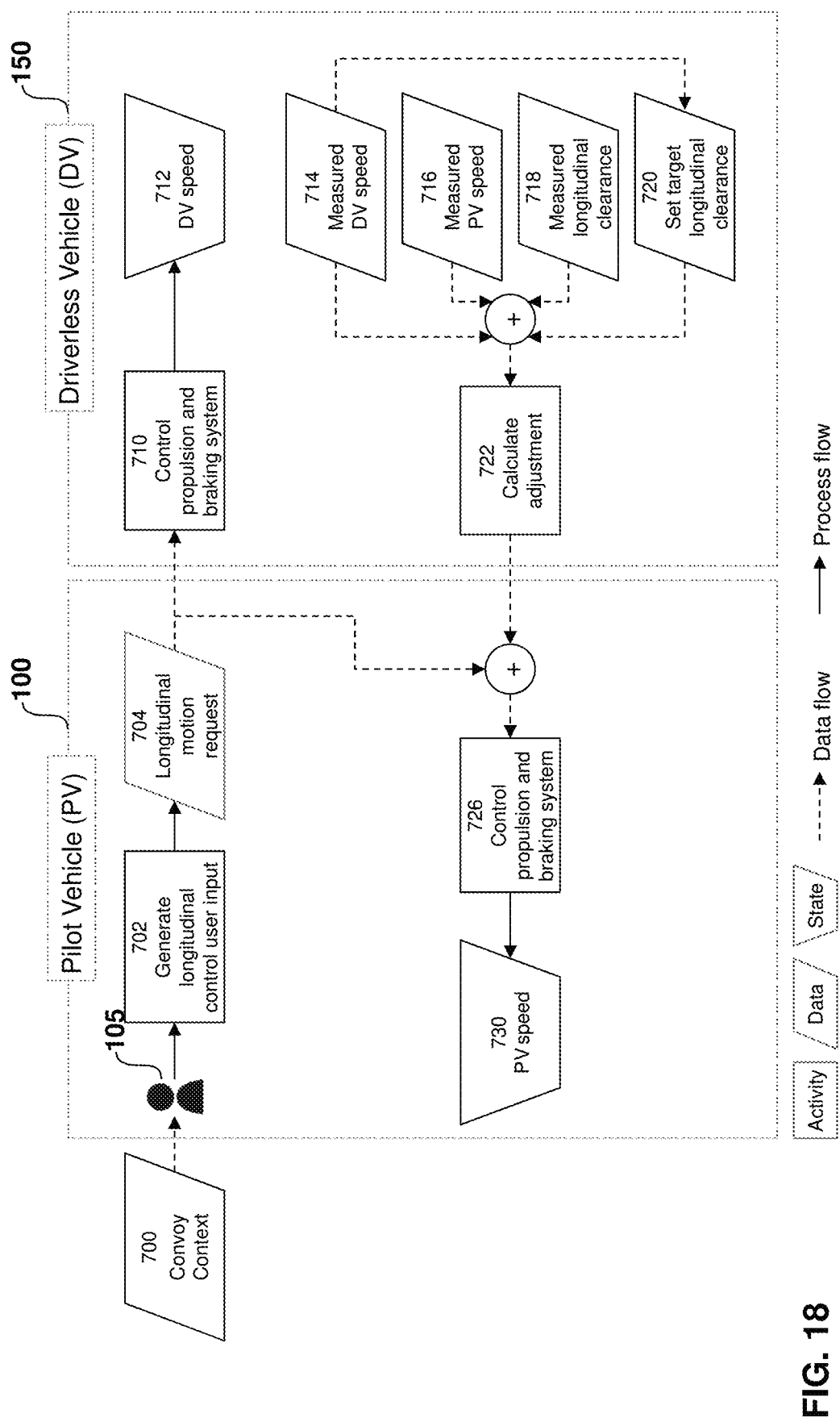
FIG. 18 is a block diagram describing an example, non-limiting embodiment of the method in accordance with various aspects described herein.

Now turning to FIG. 18, a flow chart of an example, non-limiting embodiment of the method for controlling a convoy including a pilot vehicle and at least one driverless vehicle is shown.

In the embodiment shown in FIG. 18, the pilot vehicle 100 is assumed to be the vehicle that at a given time is capable of relatively higher longitudinal acceleration performance compared to the driverless vehicle 150. Thus, the driverless vehicle's propulsion and braking system is directly controlled by pilot vehicle control user input, whereas the pilot vehicle's propulsion and braking system is controlled by the longitudinal clearance controller in such a way that a target longitudinal clearance from the driverless vehicle is maintained.

Any controlling activity may start with a convoy context 700, including
desired and requested convoy properties, as for example, time of arrival, maximum speed, and scheduled route, and
current convoy conditions, as for example actual speed, traffic conditions, traffic rules, behavior of other vehicles and traffic participants in the convoy's immediate proximity, road conditions, and ambient conditions.

Considering such convoy context, the pilot vehicle's human driver 105 may generate a longitudinal control user input 702, typically by adjusting an accelerator pedal position or a brake pedal position. A longitudinal motion request value 704, including at least one of a target speed and a target acceleration, may be derived from the control user input 702.

The driverless vehicle 150 may execute the longitudinal motion request 704 by controlling its propulsion and braking system. Controlling the driverless vehicle's propulsion and braking system 710 may include translating the longitudinal motion request 704 into driverless vehicle specific commands but typically does not include any adjustment or adaptation of the underlying requested target speed or target acceleration. The driverless vehicle's propulsion and braking system cause the driverless vehicle to assume a driverless vehicle speed 712.

The pilot vehicle 100 is not just controlled by the longitudinal control user input 702 or the derived longitudinal motion request 704. Rather, the pilot vehicle's propulsion and braking system is part of a closed control loop. A longitudinal clearance controller calculates an adjustment 722 to the longitudinal motion request 704. The pilot vehicle's propulsion and braking system 726 executes an adjusted longitudinal motion request, which may be a sum of the longitudinal motion request 704 derives from the longitudinal control user input 702 and the adjustment 722.

The closed loop control is based on the following inputs:
Measured driverless vehicle speed 714
measured pilot vehicle speed 716
measured longitudinal clearance 718, and
set target longitudinal clearance 720 that is determined by driverless vehicle speed, as has been explained in FIG. 7.

The pilot vehicle propulsion and braking system 726 is controlled based on the closed loop control so that the pilot vehicle assumes a pilot vehicle speed 730.

The longitudinal clearance controller calculating adjustment 722 is configured in such a way that the actual longitudinal clearance $LC_{actual}$ between these vehicles will approach a set target longitudinal clearance $LC_{target}$, i.e. the difference between $LC_{actual}$ and $LC_{target}$ will be minimized. This principle applies to both positive and negative acceleration values.

As shown in FIG. 18, the adjustment 722 is calculated in the driverless vehicle 150 based on sensor data captured in the driverless vehicle and communicated to the pilot vehicle 100. In an alternative embodiment, the closed loop control may also be performed within the pilot vehicle and based primarily or exclusively on data captured by sensors within the pilot vehicle.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

For purposes of simplicity of explanation, the processes depicted are shown and described as a series of sequence. It is to be understood and appreciated that the claimed subject matter is not limited by the order of the steps, as some steps may occur in different orders and/or concurrently with other steps from what is depicted and described herein. Moreover, not all illustrated steps may be required to implement the methods described herein.

What is claimed is:

1. A method for controlling a convoy including a pilot vehicle and a driverless vehicle, comprising:
   electronically tethering the driverless vehicle to the pilot vehicle by establishing communication between a pilot vehicle control module and a driverless vehicle control module;
   receiving a longitudinal control user input in the pilot vehicle control module;
   communicating a longitudinal motion request from the pilot vehicle control module to the driverless vehicle control module, the longitudinal motion request being indicative of the longitudinal control user input;
   controlling a propulsion and braking system of the driverless vehicle in response to the longitudinal motion request received from the pilot vehicle; and
   controlling a propulsion and braking system of the pilot vehicle, while tethered to the driverless vehicle, to maintain a target longitudinal clearance from the driverless vehicle,
   wherein controlling the propulsion and braking system of the pilot vehicle is part of a closed-loop control that is configured to minimize a difference between the target longitudinal clearance and an actual longitudinal clearance between the pilot vehicle and the driverless vehicle.

2. The method as in claim 1, wherein the longitudinal control user input includes at least one of an accelerator pedal position and a brake pedal position.

3. The method as in claim 1, wherein the longitudinal motion request includes at least one of a virtual accelerator pedal position, a virtual brake pedal position, a target torque, a target speed, a target acceleration, a percentage of maximum torque, a brake pressure, and a percentage of a maximum brake pressure.

4. The method as in claim 1, further comprising:
   recognizing an inability of the pilot vehicle to maintain the target longitudinal clearance from the driverless vehicle and, in response thereto, modifying an output of the propulsion and braking system of the driverless vehicle.

5. The method as in claim 1, wherein controlling the propulsion and braking system of the pilot vehicle to maintain the target longitudinal clearance from the driverless vehicle includes
determining, based on an output of a distance sensor which is arranged on the driverless vehicle, the actual longitudinal clearance between the pilot vehicle and the driverless vehicle.

6. The method as in claim 5, further comprising
calculating, in the driverless vehicle control module, a desired output of the propulsion and braking system of the pilot vehicle and
communicating the desired output from the driverless vehicle to the pilot vehicle.

7. The method as in claim 5, wherein the actual longitudinal clearance between the pilot vehicle and the driverless vehicle is the shortest longitudinal distance, parallel to a longitudinal axis of the driverless vehicle, between a front of the driverless vehicle and a rear of the pilot vehicle.

8. The method as in claim 5, wherein the actual longitudinal clearance between the pilot vehicle and the driverless vehicle is the radius of a smallest imaginary circle which extends around a defined point arranged within a footprint of the driverless vehicle to the pilot vehicle.

9. The method as in claim 8, wherein the defined point is longitudinally arranged on a front of the driverless vehicle.

10. The method as in claim 8, wherein the defined point is longitudinally arranged rearwardly of a front of the driverless vehicle.

11. The method as in claim 5, wherein the actual longitudinal clearance between the pilot vehicle and the driverless vehicle is the length of a semi-major axis of an imaginary ellipse which extends around a first defined point arranged on a center axis of the driverless vehicle to a second defined point arranged on a center axis of the pilot vehicle, the semi-major axis being arranged in the center axis and the ellipse having a predetermined ratio of semi-major axis to semi-minor axis.

12. The method as in claim 1, wherein controlling the propulsion and braking system of the pilot vehicle to maintain the target longitudinal clearance from the driverless vehicle includes
determining, based on an output of a rearward facing distance sensor which is arranged on the pilot vehicle, the actual longitudinal clearance between the pilot vehicle and the driverless vehicle.

13. The method as in claim 12, further comprising
calculating, in the pilot vehicle control module, a desired output of the propulsion and braking system of the pilot vehicle based on the actual longitudinal clearance between the pilot vehicle and the driverless vehicle.

14. The method as in claim 1, wherein controlling the propulsion and braking system of the pilot vehicle to maintain the target longitudinal clearance from the driverless vehicle includes
calculating an adjusted accelerator pedal position and an adjusted brake pedal position in the driverless vehicle control module,
communicating the adjusted accelerator pedal position and the adjusted brake pedal position to the pilot vehicle control module.

15. A method for controlling a convoy including a pilot vehicle and a driverless vehicle, comprising:
electronically tethering the driverless vehicle to the pilot vehicle by establishing communication between a pilot vehicle control module and a driverless vehicle control module;
receiving a longitudinal control user input in the pilot vehicle control module;
selecting one of the pilot vehicle or the driverless vehicle as a selected vehicle to be controlled by the longitudinal control user input, the other being a not selected vehicle;
controlling a propulsion and braking system of the selected vehicle in response to the longitudinal control user input; and
controlling a propulsion and braking system of the not selected vehicle, within a closed-loop control, to maintain a target longitudinal clearance from the selected vehicle.

16. The method as in claim 15, wherein in an initial state the driverless vehicle is selected to be controlled by the longitudinal control user input.

17. The method as in claim 15, further comprising
recognizing an inability of the not selected vehicle to maintain the target longitudinal clearance from the selected vehicle and in response thereto switching the selection between the pilot vehicle or the driverless vehicle.

18. The method as in claim 15, further comprising
measuring an actual longitudinal clearance between the pilot vehicle and the driverless vehicle,
comparing the actual longitudinal clearance with a minimum longitudinal clearance and a maximum longitudinal clearance, and
switching the selection between the pilot vehicle or the driverless vehicle when the actual longitudinal clearance exceeds the maximum longitudinal clearance or the actual longitudinal clearance falls below the minimum longitudinal clearance.

19. The method as in claim 15, further comprising controlling a steering system of the driverless vehicle to follow a path of the pilot vehicle, wherein the driverless vehicle may be operated in one of three modes, including
a center-aligned mode in which, while driving straight, a center axis of the pilot vehicle and a center axis of the driverless vehicle are aligned,
a left-aligned mode in which, while driving straight, a left side of the pilot vehicle and a left side of the driverless vehicle are aligned, and
a right-aligned mode in which, while driving straight, a right side of the pilot vehicle and a right side of the driverless vehicle are aligned.

20. The method as in claim 15, further comprising
receiving a lateral control user input in the pilot vehicle control module;
communicating a lateral motion request from the pilot vehicle control module to the driverless vehicle control module, the lateral motion request being indicative of the lateral control user input;
controlling a steering system of the driverless vehicle in response to the lateral motion request received from the pilot vehicle; and
controlling a steering system of the pilot vehicle, while tethered to the driverless vehicle, to follow a path of the driverless vehicle.

21. The method as in claim 20, wherein the pilot vehicle may be operated in one of three modes, including
a center-aligned mode in which, while driving straight, a center axis of the pilot vehicle and a center axis of the driverless vehicle are aligned,
a left-aligned mode in which, while driving straight, a left side of the pilot vehicle and a left side of the driverless vehicle are aligned, and a right-aligned mode in which, while driving straight, a right side of the pilot vehicle and a right side of the driverless vehicle are aligned.

22. A pilot vehicle for controlling a driverless vehicle, comprising:
- a pilot vehicle control module;
- an accelerator pedal operatively connected to the pilot vehicle control module;
- a brake pedal operatively connected to the pilot vehicle control module; and
- a propulsion and braking system,
- wherein the pilot vehicle control module is configured to electronically tether the driverless vehicle to the pilot vehicle by establishing communication between the pilot vehicle control module and a driverless vehicle control module, and
- wherein the pilot vehicle control module is configured to communicate longitudinal motion requests to the driverless vehicle control module, the longitudinal motion request being indicative of a position of the accelerator pedal and the brake pedal, and
- wherein the pilot vehicle control module is configured to control the propulsion and braking system, while tethered to the driverless vehicle, to maintain a target longitudinal clearance from the driverless vehicle within a closed-loop control that is configured to minimize a difference between the target longitudinal clearance and an actual longitudinal clearance between the pilot vehicle and the driverless vehicle.

\* \* \* \* \*